United States Patent [19]

Hawkey et al.

[11] 3,728,484

[45] Apr. 17, 1973

[54] DIGITAL DEMODULATOR

[75] Inventors: Lynn J. Hawkey; William A. Landers; Frank E. Nesbitt, all of Florissant, Mo.

[73] Assignee: McDonnell Douglas Electronics Company, St. Charles, Mo.

[22] Filed: July 26, 1971

[21] Appl. No.: 166,054

[52] U.S. Cl. ....................................178/68, 325/38 B

[51] Int. Cl. ...............................................H03k 13/22

[58] Field of Search........................178/68; 325/38 R, 325/38 A, 38 B, 42; 340/347 DD, 168 R, 347 NT; 328/166, 167

*Primary Examiner*—Thomas A. Robinson
*Attorney*—Edmund C. Rogers et al.

[57] ABSTRACT

Accurate demodulation of a digital signal is effected by using a digital filter, a digital integrator and a digital counter to provide digital demodulation of that signal, and also by repeatedly updating the time base of the clock of that digital demodulator throughout the time that signal is being demodulated.

28 Claims, 4 Drawing Figures

DIGITAL DEMODULATOR

BACKGROUND OF THE INVENTION

Digital data is more precise than analog data; and hence it frequently is desirable to transmit digital data rather than analog data. However, where, as frequently is the case, digital data is demodulated by analog techniques, drift, phase shifts and electrical transients can prevent full attainment of the precision which the use of digital data should afford. The present invention makes it possible to attain the high degree of precision which the use of digital data should afford; and it does so by providing digital demodulation of the digital data.

SUMMARY OF THE INVENTION

The digital demodulator of the present invention utilizes a digital filter to remove high frequency noise and electrical transients from the digital signal and thereby keeps such noise and transients from simulating the digital data which is to be demodulated.

In addition, the digital demodulator of the present invention uses a counter, and substantially continuously up-dates the time base of that counter to keep it in register with the time base of the digital data. In these ways, the digital demodulator of the present invention effectively obviates the problems which analog demodulators experience because of transients, drift and phase shifts. It is, therefore, an object of the present invention to provide a digital demodulator which has a digital filter that rejects high frequency noise and transients, which has a counter, and which substantially continuously updates the time base of that counter to keep it in register with the time base of the digital data.

The digital data, supplied to the digital demodulator of the present invention, is encoded so a positive slope at the end of a bit time represents a digital "1" while a negative slope represents a digital "0." To determine the slope of the data at the end of each bit time, the digital demodulator uses a clock to develop pulses, subdivides the data for each bit time into a corresponding number of data pulses, and then senses the number of data pulses which have predetermined polarities during predetermined portions of that bit time. If the number of such data pulses exceeds a predetermined value, the slope of the data at the end of that bit time was positive, and hence that data must have been a digital "1." On the other hand, if the number of such data pulses does not exceed that predetermined value, than the slope of the data at the end of that bit time was negative, and hence that data must have been a digital "0." In this way, the digital demodulator of the present invention is able to digitally determine the slope, and hence the digital value, of each bit of data. It is, therefore, an object of the present invention to provide a digital demodulator which subdivides the data for each bit time into a number of data pulses, and then senses the number of data pulses which have predetermined polarities during predetermined portions of each bit time.

The digital demodulator of the present invention has a time base which is equal to the time base of digital data of a given frequency; and that digital demodulator determines when its time base is out of synchronism with the time base of such digital data. In addition, that predetermined demodulator determines whether its time base leads or lags the time base of such digital data. Specifically, an up-down counter counts timing pulses during a predetermined portion of each bit time; and that counter counts "up" during the first half of that predetermined portion of that bit time and counts "down" during the second half of that predetermined portion of that bit time. If the time bases of the digital demodulator and of an incoming digital bit are in synchronism, the count in the up-down counter, at the end of the second half of that predetermined portion of the bit time, will be zero or plus or minus one; and no adjustment will be made in the time base of the digital demodualtor. However, if the time bases of the digital demodualtor and of the incoming digital bit are displaced more than five degrees but less than one hundred and eighty degrees, the count in the up-down counter, at the end of the second half of that prefetermined portion of the bit time, will be two or more and will be positive or negative. A negative count in the up-down counter will indicate a displacement, in one direction, between the time bases of the digital demodulator and of the incoming digital bit, whereas a positive count in that counter will indicate a displacement, in the opposite direction, between those time bases; and hence the up-down counter will enable the digital demodulator to sense the existence and the direction of any displacement between its time base and that of the incoming digital data. It is, therefore, an object of the present invention to provide a digital demodulator which has an up-down counter that counts timing pulses during a predetermined portion of each bit time, and that will develop a signal which has a magnitude and polarity that will indicate the presence and direction of any displacement between the time bases of that digital demodulator and of the digital input signal.

In the preferred embodiment of the present invention, the digits of the digital data are defined by two tones of different frequencies; and only one of those tones has a time base that is equal to the time base of the digital demodulator. As a result, it is important that the digital demodulator check the relationship of its time base to the time bases of only those bits which are constituted by tones which have time bases that are equal to that of that digital demodulator. The digital demodulator of the present invention makes certain that it checks the relationship of its time base with the time bases of only those bits which have time bases that are equal to the time base of that digital demodulator by sensing only those bits which are the third or more consecutive bit that represent the same digital value. It is, therefore, an object of the present invention to provide a digital demodulator which checks the relationship of its time base with the time bases of only those bits which have time bases equal to the time base of that digital demodulator and which are the third or more consecutive bit that represent the same digital value.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

DESCRIPTION OF THE PREFERRED EMBODIMENT

Figures 1, 2B, 3:
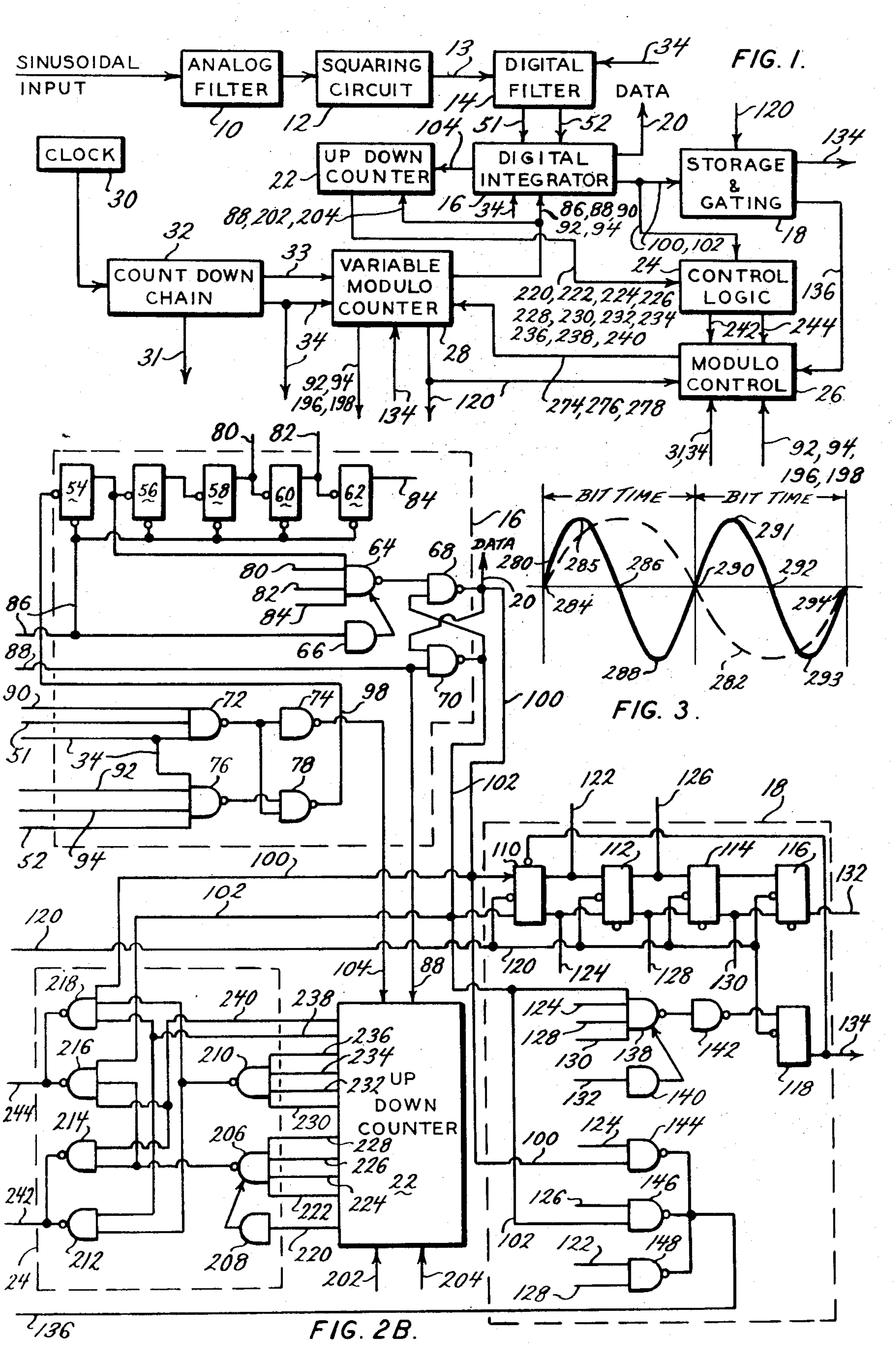
FIG. 1 is a block diagram of one preferred embodiment of digital demodulator that is made in accordance with the principles and teachings of the present invention.
FIG. 2B is a diagram which shows the up-down counter in block form but which shows the storage and gating circuit, the control logic circuit, and the digital integrator in diagrammatic form.
FIG. 3 shows two bit times of digital data.

Components of Digital Demodulator: Referring to the drawing in detail, the numeral 10 denotes a block which represents an analog filter of standard and usual design; and one such analog filter is disclosed in the 1966 Handbook Of Operation Amplifier Active RC Networks of the Burr Brown Research Corporation of Tucson, Arizona. The input of that analog filter will be connected to a source of digital data; and that data will preferably be sinusoidal in nature. The numeral 12 denotes a block which represents a squaring circuit of standard and usual design; and one such squaring circuit is disclosed in chapter 7 of the 1965 Pulse, Digital and Switching Waveforms of Jacob Millman and Herbert Taub. The input of that squaring circuit is connected to the output of the analog filter 10; and the output of that squaring circuit is connected to one input of a digital filter 14 by a conductor 13.

The numeral 16 denotes a digital integrator; and two of the inputs of that digital integrator are connected to the two outputs of the digital filter 14 by conductors 51 and 52. The numeral 20 denotes a conductor which will be connected to a suitable register or to a suitable utilization circuit, not shown, and that conductor will enable the digital integrator 16 to supply data to that register or to that utilization circuit. The numeral 18 denotes a storage and gating circuit; and some of the inputs of that storage and gating circuit are connected to two outputs of the digital integrator 16 by conductors 100 and 102. The numeral 22 denotes a block which represents an up-down counter of standard and usual design; and one such up-down counter is disclosed in the 1969 Handbook of Application Memos of the Signetics Corporation of Sunnyvale, California. Two of the inputs of that up-down counter are connected to two of the outputs of the digital integrator 16 by conductors 88 and 104.

The numeral 24 denotes a control logic circuit; and two of the inputs of that control logic circuit receive the conductors 100 and 102. Further inputs of that control logic circuit are connected to outputs of the up-down counter 22 by conductors 220, 222, 224, 226, 228, 230, 232, 234, 236, 238 and 240. The numeral 26 denotes a modulo control; and two of the inputs of that modulo control are connected to two of the outputs of the control logic circuit 24 by conductors 242 and 244. A third input of the modulo control 26 is connected to an output of the storage and gating circuit 18 by a conductor 136.

The numeral 28 denotes a variable modulo counter; and three of the inputs of that variable modulo counter are connected to three outputs of the modulo control by conductors 274, 276 and 278. Another input of the variable modulo counter 28 is connected to another output of the storage and gating circuit 18 by a conductor 134. One output of the variable modulo counter 28 is connected to an input of the modulo control 26 and to an input of the storage and gating circuit 18 by a conductor 120. Further outputs of the variable modulo counter 28 are connected to inputs of the modulo circuit 26 by conductors 92, 94, 196 and 198. The conductors 92 and 94 plus the conductors 86, 88 and 90 from the variable modulo counter 28 are connected to inputs of the digital integrator 16. Conductors 202 and 204 from the variable modulo counter 28 are connected to inputs of the up-down counter 22 as indicated by FIG. 1.

The numeral 30 denotes a block which represents an oscillator that develops a continuous supply of pulses at a precise frequency, and thus serves as the clock for the digital demodulator. One such oscillator is the JKTO–78 three and six-tenths megahertz oscillator manufactured by the C.T.S. Knights Company. The numeral 32 denotes a count down chain of standard and usual design; and one such count down chain is disclosed in the said Handbook of the Signetics Corporation. The input of that count down chain is connected to the output of the clock 30; and one output of that count down chain is connected to the modulo control 26 by a conductor 31, another output is connected to the variable modulo counter by a conductor 33, and the third output is connected to inputs of the digital filter 14 and of the digital integrator 16 and of the variable modulo counter 28 and of the modulo control 26 by a branched conductor 34.

Figure 2A:
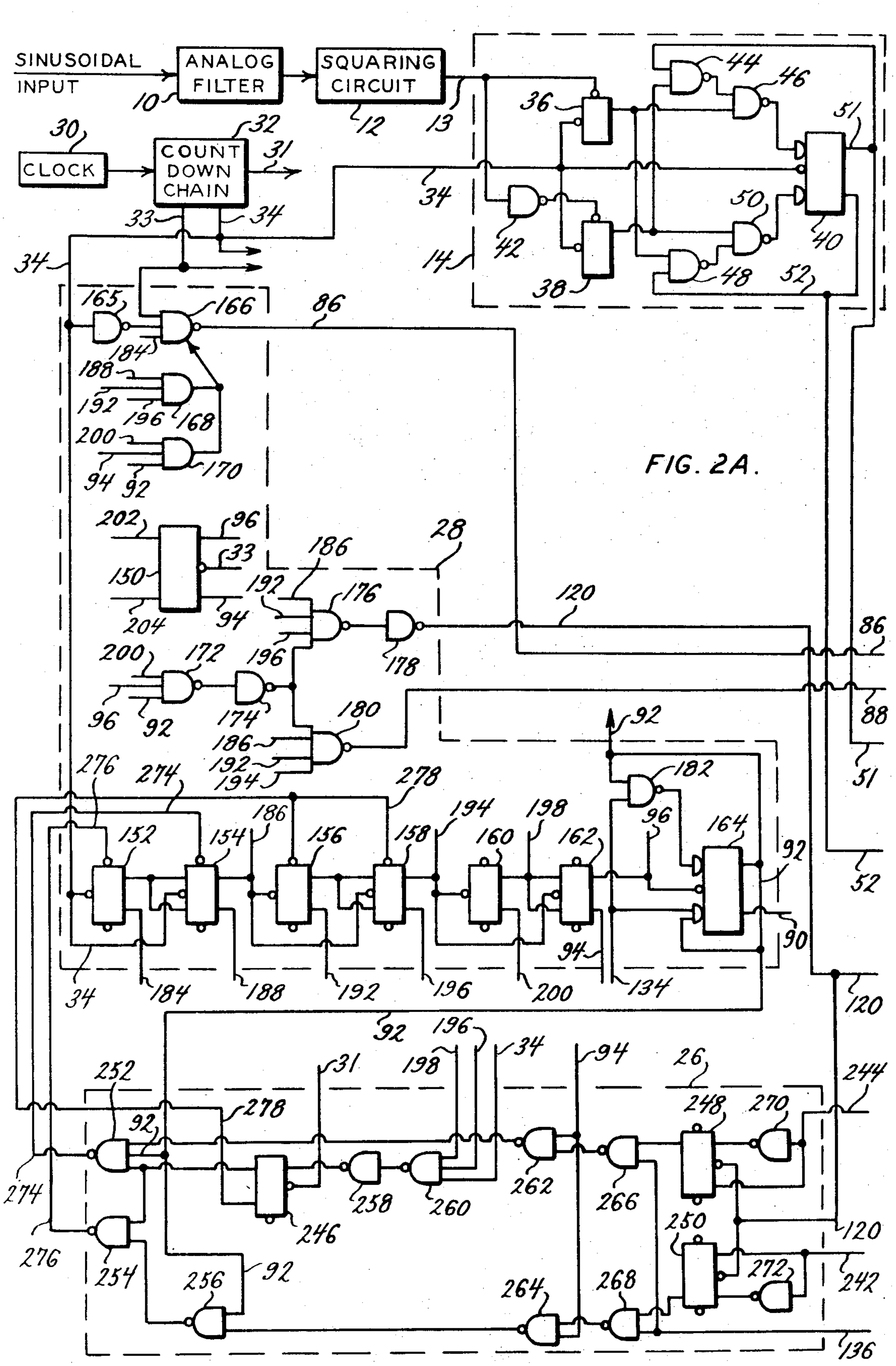
FIG. 2A is a diagram which shows the analog filter, the squaring circuit, the clock and the count-down chain in block form but which shows the variable modulo counter, the digital filter and the modulo control in diagrammatic form.

Referring particularly to FIG. 2A, the numerals 36 and 38 within the digital filter 14 denote JK flip-flops of standard and usual design. The numeral 40 denotes a set-reset flip-flop of standard and usual design which has AND gates incorporated therein as two of the inputs thereof. The numerals 42, 44, 46, 48 and 50 denotes NAND gates of standard and usual design. The clock inputs of the flip-flops 36, 38 and 40 are connected to one branch of the conductor 34 which extends from the count down chain 32. The set input of flip-flop 36 and the input of NAND gate 42 are connected to the conductor 13 which is connected to the output of the squaring circuit 12; and the set input of flip-flop 38 is connected to the output of NAND gate 42. The output of flip-flop 36 is connected to the lower input of NAND gate 46 and also to the upper input of NAND gate 48. The output of flip-flop 38 is connected to the lower input of NAND gate 44 and also to the upper input of NAND gate 50. The outputs of NAND gates 46 and 50 are connected, respectively, to the upper and lower inputs of flip-flop 40. The upper output of that flip-flop is connected to conductor 51 and also to the upper input of NAND gate 44; while the lower output of that flip-flop is connected to the conductor 52 and also to the lower input of NAND gate 48. The output of NAND gate 44 is connected to the upper input of NAND gate 46; while the output of NAND gate 48 is connected to the lower input of NAND gate 50.

The upper input of the flip-flop 36 is a direct-set input; and, whenever the state of that input changes from a digital "1" to a digital "0," the output of that flip-flop will immediately become a digital "1." Similarly, the upper input of the flip-flop 38 is a direct-set input; and, whenever the state of that input changes from a digital "1" to a digital "0," the output of that flip-flop will immediately become a digital "1." The flip-flop 36 will, whenever a "1" is applied to the upper input thereof, respond to a clock pulse to change the state of the output thereof; but it will not, whenever a "0" is applied to that upper input, respond to a clock pulse to change the state of that output. Similarly, the flip-flop 38 will, whenever a "1" is applied to the upper input thereof, respond to a clock pulse to change the state of the output thereof; but it will not, whenever a "0" is applied to that upper input, respond to a clock pulse to change the state of that output. The set-reset flip-flop 40 will respond to a clock pulse to change the state of the upper output thereof if that state is not identical to the state of the upper input thereof; and that flip-flop will respond to a clock pulse to change the state of the lower output thereof if that state is not identical to the state of the lower input thereof. Clock pulses from the count down chain 32 will be applied to the clock inputs of the flip-flops 36, 38 and 40 by the branched conductor 34 at the rate of 180,000 times per second.

The numerals 54, 56, 58, 60 and 62 in the digital integrator circuit 16 denote JK flip-flops of standard and usual design. The numeral 64 denotes a four input NAND gate, and the numeral 66 denotes a diode-type expander which is associated with that NAND gate. The NAND gate 64 and the expander 66 constitute, in effect, a five input NAND gate; and such a gate could be used instead of NAND gate 64 and expander 66. The numerals 68, 70, 72, 74, 76 and 78 denote NAND gates of standard and usual design. The output of flip-flop 54 is connected to the clock input of flip-flop 56 and also to the uppermost input of NAND gate 64. The output of flip-flop 56 is connected to the clock input of flip-flop 58; and the output of flip-flop 58 is connected to the clock input of flip-flop 60 and also is connected to the second uppermost input of NAND gate 64 by a conductor 80. The output of flip-flop 60 is connected to the clock input of flip-flop 62, and also is connected to the second lowermost input of NAND gate 64 by a conductor 82. The output of flip-flop 62 is connected to the lowermost input of NAND gate 64 by a conductor 84. The input of the expander 66 and the reset terminals of flip-flops 54, 56, 58, 60 and 62 are connected together and to the conductor 86 which extends from the variable modulo counter 28. The output of NAND gate 64 is connected to the upper input of NAND gate 68; and the output of the latter NAND gate is connected to the upper input of NAND gate 70, to the conductor 20, and to the conductor 100. The conductor 88, which extends from the variable modulo counter 28, is connected to the lower input of NAND gate 70, and also to an input of the up-down counter 22. The output of the NAND gate 70 is connected to the lower input of NAND gate 68, and also to the conductor 102.

The conductor 90, which extends from the variable modulo counter 28, is connected to the upper input of NAND gate 72; and the output of that NAND gate extends to the input of NAND gate 74 and also to the lower input of NAND gate 78. The conductor 51, which extends from the digital filter 14, is connected to the middle input of NAND gate 72; and the conductor 34, which extends from the count down chain 32, is connected to the lower input of that NAND gate and also to the uppermost input of NAND gate 76. The output of NAND gate 76 is connected to the upper input of NAND gate 78; and the output of the latter NAND gate is connected to the clock input of flip-flop 54 by a conductor 98. The output of NAND gate 74 is connected to the conductor 104. Conductors 92 and 94, which extend from the variable modulo counter 28, are connected, respectively, to the second uppermost and to the second lowermost inputs of NAND gate 76; and the conductor 52, which extends from the digital filter 14, is connected to the lowermost input of that NAND gate.

The numerals 110, 112, 114, 116 and 118 in the storage and gating circuit 18 denote JK flip-flops of standard and usual design. The numeral 138 denotes a four input NAND gate, and the numeral 140 denotes a diode-type expander which is used with that NAND gate. The NAND gate 138 and the expander 140 serve as a five input NAND gate; and such a NAND gate could be substituted for that NAND gate and that expander. The numerals 142, 144, 146 and 148 denote NAND gates of standard and usual design. The conductor 100, which extends from the digital integrator 16, is connected to the upper input of flip-flop 110, and also to the lower input of NAND gate 144. The conductor 102, which extends from that digital integrator, is connected to the lower input of flip-flop 110, to the uppermost input of NAND gate 138, and to the lower input of NAND gate 146. The clock inputs of the flip-flops 110, 112, 114, 116 and 118 are all connected together and to the conductor 120 which extends from the variable modulo counter 28. The upper output of flip-flop 110 is connected to the upper input of flip-flop 112 and also is connected to the upper input of NAND gate 148 by a conductor 122. The lower output of flip-flop 110 is connected to the lower input of flip-flop 112 and also is connected to the uppermost input of NAND gate 144 and to the second uppermost input of NAND gate 138 by a branched conductor 124. The upper output of flip-flop 112 is connected to the upper input of flip-flop 114 and also is connected to the upper input of NAND gate 146 by a conductor 126. The lower output of flip-flop 112 is connected to the lower input of flip-flop 114 and also is connected to the lower input of NAND gate 148 and to the second lowermost input of NAND gate 138 by a branched conductor 128. The upper output of flip-flop 114 is connected to the upper input of flip-flop 116; and the lower output of flip-flop 114 is connected to the lower input of flip-flop 116 and also is connected to the lowermost input of NAND gate 138 by a conductor 130. The output of flip-flop 116 is connected to the input of expander 140 by a conductor 132. The output of NAND gate 138 is connected to the input of NAND gate 142, and the output of the latter NAND gate is connected to the upper input of flip-flop 118. The output of that flip-flop is connected to the set input of flip-flop 110, and also is connected to the conductor 134 which extends to the variable modulo counter 28. The output of NAND gate 146 and the outputs of NAND gates 144 and 148 are connected together and to the conductor 136, which extends to the modulo control 26.

The input at the top of the flip-flop 110 is a direct set input; and whenever the state of that input changes from a digital "1" to a digital "0," the upper output of that flip-flop will immediately become a digital "1" while the lower output of that flip-flop will immediately become a digital "0." The upper output of that flip-flop will become a "1" and the lower output of that flip-flop will become a "0," if a clock pulse is applied to the clock input of that flip-flop while a "1" is applied to the "J" input of that flip-flop; and the upper output of that flip-flop will become a "0" and the lower output of that flip-flop will become a "1" if a clock pulse is applied to the clock input of that flip-flop while a "1" is applied to the "K" input of that flip-flop. Similarly, the upper output of each of the flip-flops 112 and 114 will become a "1" and the lower output of each of those flip-flops and the outputs of each of the flip-flops 116 and 118 will become a "0" if a clock pulse is applied to the clock input of that flip-flop while a "1" is applied to the "J" input of that flip-flop; and the upper output of each of the flip-flops 112 and 114 will become a "0" and the lower output of each of those flip-flops and the outputs of each of the flip-flops 116 and 118 will become a "1" if a clock pulse is applied to the clock input of that flip-flop while a "1" is applied to the "K" input of that flip-flop. Clock pulses from the variable modulo counter 28 will be applied to the clock inputs of the flip-flops 110, 112, 114, 116 and 118 by the conductor 120 at the rate of 2400 per second.

The numerals 150, 152, 154, 156, 158, 160 and 162 in the variable modulo counter 28 denote JK flip-flops of standard and usual design; and the numeral 164 denotes a set-reset flip-flop of standard and usual design which has AND gates incorporated therein as the upper and lower inputs thereof. The numeral 166 denotes a NAND gate, and the numerals 168 and 170 denote diode-type expanders which are associated with that NAND gate. A nine input NAND gate or a combination of NAND gates which aggregate nine inputs could be used for the NAND gate 166 and the expanders 168 and 170. The numerals 165, 172, 174, 176, 178, 180 and 182 denote NAND gates of standard and usual design.

The clock inputs of flip-flops 152 and 154 and the input of NAND gate 165 are connected to one branch of the conductor 34 which extends from the count down chain 32. The output of that NAND gate is connected to the middle input of NAND gate 166. The set input of the flip-flop 152 is connected to the conductor 276 which extends from the modulo control 26. The upper output of flip-flop 152 is connected to both the upper and lower inputs of flip-flop 154; and the lower output of flip-flop 152 is connected to the lowermost input of NAND gate 166 by a conductor 184. The upper input of NAND gate 166 is connected to the conductor 33 which extends from the count down chain 32; and the output of that NAND gate is connected to the conductor 86 which extends to the digital integrator 16. The set input of flip-flop 154 is connected to the conductor 274 which extends from the modulo control 26; and the upper output of that flip-flop is connected to the clock inputs of flip-flops 156 and 158, and also is connected to the uppermost input of NAND gate 176 and to the second uppermost input of NAND gate 180 by a branched conductor 186. The lower output of flip-flop 154 is connected to the uppermost input of expander 168 by a conductor 188. The set inputs of flip-flops 156 and 158 are connected to the conductor 278 which extends from the modulo control 26. The upper output of flip-flop 156 is connected to both the upper and lower inputs of flip-flop 158; and the lower output of flip-flop 156 is connected to the middle input of expander 168, to the second uppermost input of NAND gate 176, and to the second lowermost input of NAND gate 180 by a branched conductor 192. The upper output of flip-flop 158 is connected to the clock terminals of flip-flops 160 and 162, and also is connected to the lowermost input of NAND gate 180 by a conductor 194. The lower output of flip-flop 158 is connected to the lowermost input of exapnder 168, to the second lowermost input of NAND gate 176, and to the modulo control 26 by three branches of the conductor 196. The upper output of flip-flop 160 is connected to the upper and lower inputs of flip-flop 162, and also is connected to the modulo control 26 by the conductor 198. The lower output of the flip-flop 160 is connected to the upper input of expander 170 and to the upper input of NAND gate 172 by a branched conductor 200. The upper output of flip-flop 162 is connected to the clock input of reset-set flip-flop 164, and also is connected to the middle input of NAND gate 172 and to the upper input of flip-flop 150 by a branched conductor 96. The lower output of flip-flop 162 is connected to the middle input of expander 170, to the lower input of flip-flop 150, and to the modulo control 26 by three branches of the conductor 94.

The conductor 134, which extends from the storage and gating circuit 18, is connected to the upper terminal of the AND gate which serves as the lower input of reset-set flip-flop 164 and also to the lower input of NAND gate 182. The output of NAND gate 182 is connected to the AND gate which serves as the upper input of flip-flop 164. The upper output of flip-flop 164 is connected to the upper input of NAND gate 182, is connected to the lower input of the AND gate which serves as the lower input of that flip-flop, and is connected to the conductor 92 which extends to the modulo control 26 and to the second uppermost input of NAND gate 76 in the digital integrator 16. The lower output of flip-flop 164 is connected to the conductor 90 which extends to the uppermost input of NAND gate 72 in the digital integrator 16.

The clock input of the flip-flop 150 is connected to one branch of the conductor 33 which extends from the count down chain 32. The upper output of that flip-flop is connected to one input of the up-down counter 22 by the conductor 202; and the lower output of that flip-flop is connected to another input of that up-down counter by the conductor 204. The output of NAND gate 172 is connected to the input of NAND gate 174; and the output of the latter NAND gate is connected to the lowermost input of NAND gate 176 and to the uppermost input of NAND gate 180. The output of NAND gate 176 is connected to the input of NAND gate 178; and the output of the latter NAND gate is connected to the conductor 120 which extends to the storage and gating circuit 18 and also to the modulo control 26. The output of NAND gate 180 is connected to the conductor 88 which extends to the lower input of NAND gate 70 in the digital integrator 16 and also to the reset input of the up-down counter 22.

The set input at the top of each of the flip-flops 152, 154, 156 and 158 is a direct set input; and, whenever the state of that input changes from a digital "1" to a digital "0," the upper output of the flip-flop will immediately become a digital "1" while the lower output of that flip-flop will immediately become a digital "0." The flip-flops 152, 156 and 160 do not have conductors connected to the "J" or "K" inputs thereof; and hence those inputs of those flip-flops will effectively and continuously be in the "1" state. As a result, each time a negative-going pulse is applied to the clock inputs of those flip-flops, the output states of those flip-flops will change. The "J" or "K" inputs of flip-flops 154, 158 and 162 are connected together; and hence each time a negative-going pulse is applied to the clock inputs of those flip-flops while "1" signals are applied to those "J" and "K" inputs, the output states of those flip-flops will change. However, the output states of flip-flops 154, 158 and 162 will not change if "0" signals are applied to the "J" and "K" inputs thereof. The set-reset flip-flop 164 will respond to a clock pulse to change the state of the upper output thereof if that state is not identical to the state of the upper input thereof; and that flip-flop will respond to a clock pulse to change the state of the lower output thereof if that state is not identical to the state of the output of the AND gate which serves as the lower input thereof.

The up-down counter 22 has five UP outputs, has four NOT UP outputs, a PLUS output, and a MINUS output; and all of those outputs are connected to the control logic circuit 24. The numeral 206 in that control logic circuit denotes a four-input NAND gate, and the numeral 208 denotes a diode-type expander which is used with that NAND gate. The NAND gate 206 and the expander 208 serve as a five-input NAND gate; and such a NAND gate could be used instead of that NAND gate and that expander. The numerals 210, 212, 214, 216 and 218 denote NAND gates of standard and usual design. The UP 1 output of the up-down counter 22 is connected to the input of expander 208 by the conductor 220; and the UP2 through UP 5 outputs of that up-down counter are connected to the inputs of NAND gate 206 by the conductors 222, 224, 226 and 228. The output of NAND gate 206 is connected to the lower input of NAND gate 214 and to the middle input of NAND gate 216. The four NOT UP outputs of the up-down counter 22 are connected to the four inputs of NAND gate 210 by the conductors 230, 232, 234 and 236. The output of that NAND gate is connected to the lower input of NAND gate 212 and to the middle input of NAND gate 218. The PLUS output of up-down counter 22 is connected to the upper input of NAND gate 212 and to the lower input of NAND gate 218 by the conductor 238. The MINUS output of that up-down counter is connected to the upper input of NAND gate 214 and to the lower input of NAND gate 216 by the conductor 240. The upper input of NAND gate 216 has one branch of the branched conductor 102, from the digital integrator 16, connected to it; and the upper input of NAND gate 218 has one branch of the branched conductor 100, from that digital integrator, connected to it. The outputs of NAND gates 212 and 214 are connected together, and are connected to the modulo control 26 by the conductor 242. The outputs of NAND gates 216 and 218 are connected together, and are connected to that modulo control by the conductor 244.

The numerals 246, 248 and 250 in the modulo control 26 denote JK flip-flops of standard and usual design; and the numerals 252, 254, 256, 258, 260, 262, 264, 266, 268, 270 and 272 in that modulo control denote NAND gates of standard and usual design. The conductor 244 from the control logic circuit 24 extends to the input of NAND gate 270 and to the lower input of flip-flop 248. The conductor 242 from that control logic circuit extends to the input of NAND gate 272 and to the upper input of flip-flop 250. The conductor 120 from the variable modulo counter 28 is connected to the clock inputs of the flip-flops 248 and 250. The output of NAND gate 270 is connected to the upper input of flip-flop 248; and the output of NAND gate 272 is connected to the lower input of flip-flop 250. The output of flip-flop 248 is connected to the upper input of NAND gate 266; and the output of flip-flop 250 is connected to the upper input of NAND gate 268. The conductor 136, which extends from the storage and gating circuit 18, is connected to the lower inputs of NAND gates 266 and 268. The output of NAND gate 266 is connected to the lower input of NAND gate 262; and the output of NAND gate 268 is connected to the upper input of NAND gate 264. One branch of the branched conductor 94, which extends from the lower output of flip-flop 162 in the variable modulo counter 28, is connected to the upper input of NAND gate 262 and to the lower input of NAND gate 264. The output of NAND gate 262 is connected to the uppermost input of NAND gate 252; and the output of NAND gate 264 is connected to the lower input of NAND gate 256. The conductor 198, which extends from the upper output of flip-flop 160 in the variable modulo counter 28, is connected to the uppermost input of NAND gate 260. The conductor 196, which extends from the lower output of flip-flop 158 in the variable modulo counter 28, is connected to the middle input of NAND gate 260; and the conductor 34, which extends from the count down chain 32, is connected to the lowermost input of that NAND gate. The output of NAND gate 260 is connected to the input of NAND gate 258; and the output of the latter NAND gate is connected to the upper input of flip-flop 246. The clock terminal of that flip-flop is connected to the conductor 31 which extends from the count down chain 32; and the upper output of that flip-flop is connected to the lower input of NAND gate 252 and to the upper input of NAND gate 254. The lower output of flip-flop 246 is connected to the conductor 278 which extends to the variable modulo counter 28. The conductor 92, which extends from the variable modulo counter 28, is connected to the middle input of NAND gate 252 and to the upper input of NAND gate 256. The output of NAND gate 256 is connected to the lower input of NAND gate 254; and the output of the latter NAND gate is connected to the conductor 276 which extends to the variable modulo counter 28. The output of NAND gate 252 is connected to the conductor 274 which extends to the variable modulo counter 28.

Generation of Timing Pulses: The three and six-tenths megahertz output of the clock 30 is applied to the input of the count down chain 32; and that count down chain develops three signals having different frequencies. Specifically, that count down chain supplies a one and eight-tenths megahertz signal to the conductor 31, supplies a 900 kilohertz signal to the conductor 33, and supplies a 180 kilohertz signal to the conductor 34. Those conductors supply those signals to various components of the digital demodulator to appropriately time the actuations of those components.

Analog Filtering and Waveform Squaring: The analog filter 10, in the said one preferred embodiment of the present invention, is a multiple feedback, low pass filter with a three decibel cutoff frequency of 4800 Hertz. The signal which is supplied to the input of that analog filter will be digital in nature, will be sinusoidal in character, and will include 2400 Hertz tones and 1200 Hertz tones. Any bit which has a positive slope at the end of the bit time will be a digital "1;" but any bit which has a negative slope at the end of the bit time will be a digital "0." The bit rate of the input signal will be 2400 per second, and the modulation will preferably be developed by continuous phase, frequency shift keying. The output of the analog filter 10 will be supplied to the squaring circuit 12; and that squaring circuit will produce steep-sided, flat-top positive-going and flat-bottom negative-going signals. Those signals will be applied to the upper input of the digital filter 14 by the conductor 13.

Operation of Digital Filter: To illustrate the operation of the digital filter 14, it will be assumed that the flip-flop 40 is applying a "1" to the conductor 51 and also to the upper input of NAND gate 44, and that it is applying a "0" to the conductor 52 and also to the lower input of NAND gate 48. Further, it will be assumed that a "1" is being applied to the set input of flip-flop 36 by conductor 13, and that a "0" is being applied to the set input of flip-flop 38 by NAND gate 42. In addition, it will be assumed that flip-flop 38 is applying a "1" to the lower input of NAND gate 44 and to the upper input of NAND gate 50. Regardless of the state of the output of flip-flop 36, NAND gate 44 will be applying a "0" to the upper input of NAND gate 46, and the latter NAND gate will be applying a "1" to the upper input of flip-flop 40; and NAND gate 48 will be applying a "1" to the lower input of NAND gate 50, and the latter NAND gate will be applying a "0" ) to the lower input of flip-flop 40.

The next clock pulse will not change the state of the output of flip-flop 38, because a "0" appears at the set input of that flip-flop; and it will not change the output states of the flip-flop 40, because both the upper input and the upper output are "1" and both the lower input and the lower output are "0." However, that clock pulse will cause the output of flip-flop 36 to change state; but that change of state will not be significant, because the output of flip-flop 38 and the outputs of flip-flop 40 will coact with the NAND gates 44, 46, 48 and 50 to keep the upper and lower inputs of the latter flip-flop unchanged. As long as the set inputs of the flip-flops 36 and 38 remain unchanged, the flip-flop 36 will respond to clock pulses to change the state of the output thereof at the rate of 180,000 times per second, but the flip-flops 38 and 40 will be unaffected by those clock pulses, and thus will keep the output states thereof unchanged.

If the "1" signal applied by the conductor 13 changes to a "0," the signal which NAND gate 42 applies to the set input of flip-flop 38 will change from "0" to a "1." At such time, the output of flip-flop 36 will be a "1," and the output of flip-flop 38 will continue to be a "1;" and the latter "1" will coact with the outputs of flip-flop 40 and with the NAND gates 44, 46, 48 and 50 to keep the inputs of the latter flip-flop unchanged. If the "0" signal applied by the conductor 13 is noise or an electrical transient which disappears before the next clock pulse is applied to the clock inputs of the flip-flops 36, 38 and 40, the "1" will re-appear at the set input of flip-flop 36 and the "0" will re-appear at the set input of flip-flop 38; and hence when that next clock pulse is applied to the clock inputs of the flip-flops 36, 38 and 40, no change of state will occur at the outputs of flip-flops 38 and 40. This means that the digital filter will not change the output states thereof in response to noise or electrical transients which appear on conductor 13 but which disappear before the next clock pulse is applied to the clock inputs of the flip-flops 36, 38 and 40.

If the "0" signal applied by the conductor 13 continues until a clock pulse is applied to the clock inputs of the flip-flops 36, 38 and 40, that clock pulse will leave the output of flip-flop 36 unchanged as a "1," and will leave the upper and lower outputs of flip-flop 40 unchanged as "1" and "0," respectively. However, that clock pulse will cause the flip-flop 38 to change its output state from "1" to "0;" and hence that output state will no longer be able to coact with the outputs of flip-flop 40 and with the NAND gates 44, 46, 48 and 50 to keep the inputs of the latter flip-flop unchanged. Specifically, the change from "1" to "0" at the output of flip-flop 38 will cause the outputs of NAND gates 44 and 50 to change from "0" to "1" and will cause the output of NAND gate 46 to change from "1" to "0" — with the changes in the outputs of NAND gate 46 and 50 changing the states of the upper and lower inputs of flip-flop 40 to "0" and "1," respectively. However, if the "0" signal applied by the conductor 13 is noise or an electrical transient which disappears before a second clock pulse is applied to the clock inputs of the flip-flops 36, 38 and 40, the "1" will reappear at the set input of flip-flop 36 and the "0" will reappear at the set input of flip-flop 38; and hence the output state of NAND gate 46 will change back to a "1" and the output state of each of NAND gates 44 and 50 will change back to a "0" — thereby changing the states of the upper and lower inputs of flip-flop 40 back to "1" and "0," respectively. Consequently, when that second clock pulse is applied to the clock inputs of the flip-flops 36, 38 and 40, the output state of flip-flop 36 will change, but the output states of flip-flops 38 and 40 will remain unchanged. This means that the digital filter will not change the output states thereof in response to noise or electrical transients which appear on conductor 13 but which disappear before two successive clock pulses are applied to the clock inputs of flip-flops 36, 38 and 40.

However, if the "0" signal applied by the conductor 13 had not disappeared before the second clock pulse was applied to the clock inputs of the flip-flops 36, 38 and 40, that second clock pulse would cause the flip-flop 40 to change its upper output from "1" to "0" and to change its lower output from "0" to "1." That second clock will not cause the flip-flop 36 to change the output state thereof, because the input of that flip-flop is still "0;" but that second clock will cause the flip-flop 38 to change the output state thereof to a "1." The changes in the output states of flip-flops 38 and 40 will give the NAND gates 46 and 48 output states of "0" and will give the NAND gates 44 and 50 output states of "1." Importantly, as long as the conductor 13 continues to apply a "0" signal to the set input of flip-flop 36, the "1" at the output of that flip-flop will coact with the "0" at the upper output of flip-flop 40 and with the "1" at the lower output of that latter flip-flop to maintain a "0" at the upper input of flip-flop 40 and to maintain a "1" at the lower input of that flip-flop. Consequently, although succeeding clock pulses, applied to the clock inputs of the flip-flops 36, 38 and 40 will change the output state of the flip-flop 38, the output of flip-flop 36 and the outputs of flip-flop 40 will coact with the NAND gates 44, 46, 48 and 50 to keep the upper and lower inputs of the latter flip-flop unchanged.

All of this means that the digital filter 14 will reject, and will not change the outputs thereof in response to, any high frequency noise or electrical transients which have durations that do not equal or exceed the duration of a full cycle of the one hundred and eighty kilohertz clock applied to the conductor 34 by the count down chain 32. Also, it means that the digital data, which that digital filter applies to the conductors 51 and 52, can not change polarity between each timing pulse from the branched conductor 34. In addition, it means that the digital filter 14 will, at the rate of one hundred and eighty thousand times per second, sense the state of the signal supplied by the conductor 13; and it will maintain a constant signal of appropriate polarity on the conductor 51 and a constant signal of complementary polarity on the conductor 52 as long as the signal supplied by conductor 13 remains unchanged. However, that digital filter will, in less than two cycles of the 180 kilohertz clock, respond to a change in the signal applied by the conductor 13 to change the states of the signals on the conductors 51 and 52.

Operation of the Digital Integrator: The digital filter 14 will apply a "1" to the NAND gate 72 and a "0" to the NAND gate 76 of the digital integrator 16, via the conductors 51 and 52, respectively, whenever a bit representing a digital "1" is being applied to the conductor 13; and that digital filter will apply a "0" to the NAND gate 72 and a "1" to the NAND gate 76 whenever a bit representing a digital "0" is being applied to conductor 13. Those NAND gates will respond to those signals and also to signals from the variable modulo counter 28 and the count down chain 32 to provide appropriately gated data pulses. The gated data pulses from the NAND gate 76 will be inverted by the NAND gate 78, and then applied by conductor 98 to the clock input of a counting chain which is constituted by the flip-flops 54, 56, 58, 60 and 62. The gated data pulses from the NAND gate 72 will be inverted by the NAND gate 74, and then applied to the up-down counter 22 by the conductor 104; and those gated data pulses also will be inverted by the NAND gate 78, and then applied by conductor 98 to the clock input of the counting chain. Because that counting chain counts only negative-going transitions; and because the NAND gate 78 requires "1" signals at both of its inputs to develop a "0" signal at its output, that NAND gate provides a delay, equal to one-half of a cycle of the one hundred and eighty kilohertz signal from branched conductor 34, between the development of a "0" signal at its input and the application of a "0" signal to the clock input of the flip-flop 54.

The signal from the count down chain 32 will be applied to the NAND gates 72 and 76 by one branch of the branched conductor 34; and that signal will have a frequency of 180 kilohertz. Because the bit rate of the digital data applied to the input of the analog filter 10 will be two and four tenths kilohertz, the branched conductor 34 will apply 75 data pulses to the NAND gates 72 and 76 during each bit time. Those 75 data pulses will have equal durations — each data pulse essentially having a duration of five and one-half microseconds. Also, each data pulse will have a constant polarity throughout its duration, because the digital filter 14 will not change its output state between each timing pulse from the branched conductor 34.

If the digital integrator 16 were required to integrate all of the 75 data pulses which are supplied to it during each bit time, any appreciable differential phase delay could adversely affect the ability of that digital integrator to supply correct digital data to the conductor 20. Consequently, to keep differential phase delays, having durations up to one-quarter of a bit time, from adversely affecting the ability of the digital integrator 16 to supply correct digital data to the conductor 20, and also to provide three-eighths of a bit time as a noise margin, the said one preferred embodiment of the present invention causes that digital integrator to integrate data pulses during just three-quarters of a bit time. This means that the maximum number of data pulses which the counting chain, of the digital integrator 16, could be expected to count during any bit time would be 56.

The time base of the said one preferred embodiment of digital demodulator is selected to be the same as the time base of a 2400 Hertz tone; and, if such a tone has the phase indicated by the curve 280 in FIG. 3, the slope of that tone will be positive at the end of each bit time — and hence each cycle of that tone will represent a digital "1." However, if that 2400 Hertz tone were to be phase displaced 180° in either direction, the slope of that tone would be negative at the end of each bit time — and hence each cycle of that tone would represent a digital "0." The time base of the 1200 Hertz tone is twice as long as the time base of the digital demodulator; and hence, during any given bit time, that 1200 Hertz tone should be wholly positive or wholly negative — as shown by the curve 282 in FIG. 3. At the point 290 in FIG. 3, which represents the end of the first bit time, the slope of that 1200 Hertz tone is negative — and hence that half-cycle of that tone will represent a digital "0." However, at the point 294, which represents the end of the second bit time, the slope of that 1200 Hertz tone is positive — and hence that half-cycle of that tone will represent a digital "1."

To determine the slope at the end of each bit time, and thus the polarity of the corresponding bit of digital data, the digital demodulator subdivides each bit of data into 75 data pulses, and then counts the number of data pulses during predetermined portions of each bit time. Specifically, after it subdivides each data bit into 75 data pulses, the digital integrator 16 counts the number of data pulses developed by the negative portion of a data bit during the time interval between the points 286 and 288 in FIG. 3, and then counts the number of data pulses developed by the positive-portion of a data bit during the time interval between the points 290 and 292. The optimum number of pulses which could be developed by the negative portion of a data bit during the time interval between the points 286 and 288 in FIG. 3 is 18, and the maximum number of pulses which could be developed by the positive portion of a data bit during the time interval between the points 290 and 292 is 38 — making a total of 56 data pulses. This means that if the digital integrator 16 were to count a total of 56 pulses during the time interval between the points 286 and 288 and the time interval between the points 290 and 292, the data bit that was being sensed would be a digital "1." In practice, it has been found that if that digital integrator counts more than one-half of that maximum number of data pulses, it can be assumed that the data bit was a digital "1." Consequently, if the total count in the digital integrator 16 is 29 or more at the point 292, the bit that was sensed between the points 286 and 292 was a digital "1." However, if that total count is 28 or less, the bit that was sensed between the points 286 and 292 was a digital "0." Similarly, if the total count in the digital integrator 16 is 29 or more at the point 286, the bit that was sensed during the half-cycles prior and subsequent to the point 284 was a digital "1;" but if that total count was 28 or less, that bit was a digital "0." Again, if the total count in the digital integrator is 29 or more at the end of the half-cycle which succeeds the point 294, the bit that was sensed during the half-cycles prior and subsequent to that point was a digital "1;" but if that total count was 28 or less, that bit was a digital "0."

The variable modulo counter 28 normally applies a steady "1" to the conductor 86, and thus to the input of expander 66 and to the re-set inputs of flip-flops 54, 56, 58, 60 and 62 in the digital integrator 16. However, at the points 286 and 292 in FIG. 3, and at the midpoint of each other bit time, the variable modulo counter will momentarily change that "1" to a "0;" and, in doing so, will re-set the outputs of all of the flip-flops 54, 56, 58, 60 and 62 to "0," and will momentarily keep the NAND gate 64 from developing a "0" at the output thereof. The "0" signal on the conductor 86 has a frequency of 900 kilohertz, and hence that signal will re-set the flip-flops 54, 56, 58, 60 and 62 shortly after the midpoint of each bit time.

The variable modulo counter 28 normally applies a steady "0" to the conductor 120, and thus to the storage and gating circuit 18 and to the modulo control 26. However, close to the points 288 and 293, and close to the three-quarters point of each other bit time, that variable modulo counter will momentarily change that "0" to a "1." The variable modulo counter 28 normally applies a steady "1" to the conductor 88, and thus to the lower input of NAND gate 70 in the digital integrator 16 and also to the up-down counter 22. However, about 22 microseconds after the variable modulo counter 28 momentarily changes the "0" on conductor 120 to a "1," it will momentarily change the "1" on conductor 88 to a "0;" and, in doing so, will cause a "1" to appear at the output of NAND gate 70, and hence at the lower input of NAND gate 68. Because NAND gate 64 normally causes a "1" to appear at the upper input of NAND gate 68, the output of the latter NAND gate, and hence the upper input of NAND gate 70, will be or will become a "0."

During the time interval between the points 284 and 286 in FIG. 3, during the time interval between the points 290 and 292, and during the first halves of each other bit time, the variable modulo counter 28 will be applying a steady "1" to the conductor 90, and thus to the upper input of NAND gate 72. However, during the time interval between the points 286 and 290, during the time interval between the points 292 and 294, and during the last halves of each other bit time, that variable modulo counter will be applying a steady "0" to the conductor 90, and thus to the upper input of NAND gate 72. During the time interval between the points 286 and 290, during the time interval between the points 292 and 294, and during the last halves of each other bit time, the variable modulo counter 28 will be applying a steady "1" to the conductor 92, and thus to the second uppermost input of NAND gate 76, and also to the modulo control 26. However, during the time interval between the points 284 and 286, during the time interval between the points 290 and 292, and during the first halves of each other bit time, that variable modulo counter will be applying a steady "0" to the conductor 92, and thus to the second uppermost input of NAND gate 76. During the time interval between the points 284 and 285, during the time interval between the points 286 and 288, during the time interval between the points 290 and 291, during the time interval between the points 292 and 293, and during the first and third quarters of each other time bit, the variable modulo counter 28 will apply a steady "1" to the conductor 94, and thus to the second lowermost input of NAND gate 76. However, during the time interval between the points 285 and 286, during the time interval between the points 288 and 290, during the time interval between the points 291 and 292, during the time interval between the points 293 and 294, and during the second and fourth quarters of each other time bit, that variable modulo counter will apply a steady "0" to the conductor 94, and thus to the second lowermost input of NAND gate 76.

The overall result is that the following sequence will begin. At the point 286 in FIG. 3, the momentary "0" on conductor 86 will re-set the outputs of all of flip-flops 54, 56, 58, 60 and 62 to "0," and will momentarily fix the output of NAND gate 64 as a "1." During that portion of the time interval between points 286 and 288 wherein the signal on conductor 52 is a "1," NAND gate 76 will respond to the 180 kilohertz timing pulses on conductor 34 to develop data pulses, and apply them to the upper input of NAND gate 78.

Shortly after the point 288, the fall of the "1" on the conductor 120 will "clock" the flip-flops 110, 112, 114, 116, and 118 in the storage and gating circuit 18 and will "clock" the flip-flops 248 and 250 in the modulo control 26. During the time interval between the points 288 and 290 in FIG. 3, the "0" on conductor 90 and the " 0" on conductor 94 will cause the NAND gates 72 and 76 to apply steady "1" signals to both inputs of the NAND gate 78. That NAND gate will thus apply a steady "0" to the clock input of flip-flop 54 during that time interval, and hence no data pulses can be applied to, or counted by, the counting chain during that time interval. About 22 microseconds after the point 288, the momentary "0" on conductor 88 will make the output of NAND gate 70 become a "1," and thus will make the output of NAND gate 68 become a "0." During that portion of the time interval between the points 290 and 292, wherein the signal on conductor 51 is a "1," NAND gate 72 will respond to the 180 kilohertz timing pulses on conductor 34 to develop data pulses, and apply them to the lower input of NAND gate 78.

If the waveform being applied to the input of the analog filter 10 during the time interval between the points 286 and 292 in FIG. 3 is congruent with the curve 280, and if that waveform is completely free of noise and electrical transients, the NAND gate 76 will develop 18 negative-going data pulses during the time interval between the points 286 and 288, and the NAND gate 72 will develop 38 negative-going data pulses during the time interval between the points 290 and 292. The NAND gate 78 will invert those data pulses and apply them to the clock input of flip-flops 54. The negative-going edge of the first data pulse applied to the clock input of flip-flop 54 will cause that flip-flop to change the output thereof from a "0" to a "1" and to apply that "1" to the uppermost input of NAND gate 64. However, because flip-flops 58, 60 and 62 are applying steady "0" signals to the remaining inputs of that NAND gate via the conductors 80, 82 and 84, respectively, that NAND gate will continue to maintain a continuous "1" at the output thereof. As the negative-going edge of the fourth data pulse is applied to the clock input of flip-flop 54 by conductor 98, the signal on conductor 80 will change from a "0" to a "1." However, NAND gate 64 will continue to supply a "1" to the upper input of NAND gate 68, because flip-flops 54, 60 and 62 will apply "0" signals to the remaining inputs of the former NAND gate. As the negative-going edge of the fifth data pulse is applied to the clock input of flip-flop 54 by conductor 98, "1" signals will be applied to the two uppermost inputs of NAND gate 64 by flip-flops 54 and 58, but flip-flops 60 and 62 will apply "0" signals to the remaining two inputs of that NAND gate. When the negative-going edge of the 8th data pulse is applied to the clock input of flip-flop 54, the flip-flop 60 will apply a "1" to the second lowermost input of NAND gate 64, but flip-flops 54, 58 and 62 will apply "0" signals to the remaining inputs of that NAND gate. In similar fashion, one or more "1" signals will be applied to one or more inputs of NAND gate 64 as the negative-going edges of the ninth, 12th, 13th, 16th, 17th, 20th, 21st, 24th, 25th and 28th data pulses is applied to the clock input of flip-flop 54 by conductor 98; but one or more of the flip-flops will be applying a "0" to one of the inputs of that NAND gate. Consequently, until a total of 29 data pulses is applied to the clock input of flip-flop 54, the NAND gate 64 will maintain a steady"1" at the input of NAND gate 68. However, as the 29th of the data pulses is applied to the clock input of flip-flop 54 by conductor 98, a "1" will be present at all of the inputs of NAND gate 64 and a "1" will be present at the input of expander 66; and, thereupon, that NAND gate will apply a "0" to the upper input of NAND gate 68.

The "0" at the upper input of NAND gate 68 will cause that NAND gate to apply a "1" to the conductor 100 and to the conductor 20, and also to the upper input of NAND gate 70. Because the lower input of the latter NAND gate normally has a "1" applied to it by conductor 88, that NAND gate will develop a "0" at the output thereof — and will apply that "0" to conductor 102, and to the lower input of NAND gate 68. The NAND gate 70 will maintain the "0" at the output thereof, and will force the NAND gate 68 to maintain the "1" at the output thereof, until about 22 microseconds after the point 293 in FIG. 3. At that time, a momentary "0" will appear on the conductor 88; and that "0" will cause the NAND gate 70 to change its output to a "1," with a consequent change in the output of NAND gate 68 to a "0." The "0" at the output of NAND gate 68 will force the NAND gate 70 to maintain a "1" at the output thereof — even after the signal on conductor 88 again becomes a "1."

During the time interval between the points 286 and a time about 22 microseconds after the point 293 in FIG. 3, enough pulses were counted by the counting chain to indicate that the digital data applied to the analog filter 10 during the bit time that ended at point 290 was a "1;" and the "1" signal on conductor 100 and the "0" signal on conductor 102 so indicated. That "1" remained on conductor 100 and on conductor 20, and that "0" remained on conductor 102, until after the beginning of the next integrating cycle of the digital integrator 16. As a result, the storage and gating circuit 18 and the logic circuit 24 were given a full opportunity to sense the fact that the data was a digital "1."

If the waveform that was applied to the input of the analog filter 10 during the time interval between the points 286 and 292 in FIG. 3 had been a 2,400 Hertz tone, but had been phase displaced 180° in either direction from the curve 280, that waveform would have had a negative slope at the points 290 and 294 in FIG. 3, and thus would have been a digital "0." The digital filter 14 would have developed a "0" on the conductor 52 during the time interval between the points 286 and 288, and hence the NAND gate 76 could not have developed any data pulses during that time interval. That digital filter would have developed a "0" on the conductor 51 during the time interval between the points 290 and 292, and hence the NAND gate 72 could not have developed any data pulses during that time interval. As a result, the counting chain of the digital integrator 16 would have received and stored less than 29 data pulses; and the consequent "0" on conductor 100 and on conductor 20 and the "1" on conductor 102 would indicate that the bit which ended at point 290 was a digital "0". If the waveform that was applied to the input of the analog filter 10 during the time interval between the points 286 and 292 in FIG. 3 had been congruent with the waveform 282 in FIG. 3, the bit represented by the first half-cycle of that waveform would have had a negative slope at the point 290, and this would have been a digital "0". The digital filter 14 would have developed a "0" on the conductor 52 during the time interval between the points 286 and 288, and hence the NAND gate 76 could not have developed any data pulses during that time interval. That digital filter would have developed a "0" on the conductor 51 during the time interval between the points 290 and 292, and hence the NAND gate 72 could not have developed any data pulses during that time interval. As a result, the counting chain of the digital integrator 16 would have received and stored less thqn twenty-nine data pulses; and the consequent "0" on conductor 100 and on conductor 20 and the "1" on conductor 102 would indicate that the bit which ended at point 290 was a digital "0." However, during the time interval between points 292 and 293 in FIG. 3, the digital filter 14 would have developed a "1" on the conductor 52, and hence the NAND gate 76 could have developed as many as 18 negative-going data pulses during that time interval. That digital filter would have developed a "1" on the conductor 51 during the first half of the next-succeeding bit time, and hence the NAND gate 72 could have developed as many as 38 negative-going data pulses during that time interval. As a result, the counting chain of the digital integrator would have received and stored more than 29 data pulses; and the consequent "1" on conductor 100 and on conductor 20 and "0" on conductor 102 would indicate that the bit which ended at point 294 was a digital "1." These illustrations show how the digital integrator 16 is able to sense the slope at the end of each bit time by a wholly digital technique.

Because the digital integrator 16 counts pulses which precede and succeed the end of each bit time, that digital integrator is able to accurately sense the slope at the end of each bit time. In doing so, that digital integrator is enabled, with a high degree of accuracy, to determine whether that slope is positive or negative — and thus whether the bit producing that slope was a digital "1" or a digital "0."

The signals which appear on the conductors 100 and 102 are important, because those signals indicate to the storage and gating circuit 18 and also to the control logic circuit 24 the polarity of the data being demodulated. As a result, it is desirable to keep false signals and electrical transients from appearing on either of those conductors. The connection between the output of NAND gate 68 and the upper input of NAND gate 70 and the connection between the output of NAND gate 70 and the lower input of NAND gate 68 will coact with the normally steady signals at the upper input of NAND gate 68 and at the lower input of NAND gate 70 to help keep false signals and electrical transients from appearing on conductors 20, 100 and 102, as by normally fixing the output states of those NAND gates. Until a count of 29 is accumlated in the counting chain, the output states of NAND gates 68 and 70 will remain fixed; and, after those output states have changed in response to the change of state at the output of NAND gate 64, those output states will remain fixed until the momentary "0" is applied to the lower input of NAND gate 70. Also, the momentary "0" which the conductor 86 applies to the input of expander 66 will help keep false signals and electrical transients from appearing on the conductors 20, 100 and 102, as by applying a steady "1" to the upper input of NAND gate 68. The overall result is that the signals on the conductors 20, 100 and 102 will correctly indicate the polarity of the data being demodulated. Those signals must be clocked into the storage and gating circuit 18 and into the control logic circuit 24, and the signal on conductor 20 must be clocked into the register or utilization circuit, not shown, by the signal on conductor 120.

Operation of UP-down Counter: About 22 microseconds after the point 288 in FIG. 3, after the point 293, and after the end of the third quarter of each other bit time, the conductor 88 will momentarily apply a "0" to the re-set input of the up-down counter 22. The "0" will cause "0" signals to appear on all of the conductors 220, 222, 224, 226, 228 and 240 and will cause "1" signals to appear on all of the conductors 230, 232, 234, 236 and 238. The NAND gate 74 in the digital integrator 16 will have a steady "1" applied to The input thereof during the time interval between the points 286 and 290 in FIG. 3, during the time interval between the points 292 and 294, and during the last half of each other bit time; and hence that NAND gate will keep data pulses from being applied to the up-down counter 22 during any of those time intervals. However, during the time interval between the points 284 and 286, during the time interval between the points 290 and 292, and during the first half of each other bit time, that NAND gate can have data pulses applied to the input thereof; and that NAND gate will invert those data pulses and apply them to the up-down counter 22. In addition, that up-down counter will receive an UP signal from the flip-flop 150 in the variable modulo counter 28 via conductor 204 during the time interval between the points 284 and 285 in FIG. 3, during the time interval between the points 290 and 291, and during the first quarter of each other bit time; and it will receive a DOWN signal from that flip-flop via conductor 202 during the time interval between the points 285 and 286, during the time interval between the points 291 and 292, and during the second quarter of each other bit time.

If the digital data applied to the digital demodulator consists of 2,400 Hertz tones which are congruent with the waveform 280 in FIG. 3, the NAND gate 74 will apply nineteen pulses to the up-down counter 22 during the first quarter of each bit time, and the flip-flop 150 will apply an UP signal to that up-down counter throughout that first quarter. As a result, that up-down counter will count "up" to nineteen. During the second quarter of each bit time, the NAND gate 74 will apply nineteen further pulses to the up-down counter 22, and the flip-flop 150 will apply a DOWN signal to that up-down counter. Consequently, that up-down counter will count "down" to zero; and it will do so by "two's" complement arithmetic. The overall result is that as long as the digital data applied to the digital demodulator consists of 2,400 Hertz tones which are congruent with the waveform 280 in FIG. 3, the residual count in the up-down counter, at the midpoint of each bit time, will be zero.

If the digital data applied to the digital demodulator consists of 2,400 Hertz tones which are phase displaced from the waveform 280 in FIG. 3, the conductor 51 will not apply a "1" to the middle input of NAND gate 72 throughout the entire first half of each bit of that data; and hence the number of data pulses applied to the up-down counter 22 during the first quarter of the time base of the digital demodulator will not equal the number of data pulses applied to that up-down counter during the second quarter of that time base. Specifically, if the time base of the digital data has shifted to the left of the time base of the waveform 280 in FIG. 3, more data pulses will be applied to the up-down counter 22 during the first quarter of the time base of the digital demodulator than will be applied to that up-down counter during the second quarter of that time base. Consequently, at the midpoint of the time base of the digital demodulator, that up-down counter will have a residual count therein, and the PLUS conductor 238 will have a "1" signal thereon. Conversely, if the time base of the digital data has shifted to the right of the time base of the waveform 280 in FIG. 3, fewer data pulses will be applied to the up-down counter 22 during the first quarter of the time base of the digital demodulator than will be applied to that up-down counter during the second quarter of that time base. As a result, at the midpoint of the time base of the digital demodulator, that up-down counter will have a residual count therein and the MINUS conductor 240 will have a "1" signal thereon.

The up-down counter 22 can provide many different combinations of outputs on the conductors 220, 222, 224, 226, 228, 230, 232, 234 and 236 which will represent various residual counts within that up-down counter at the midpoint of the time base of the digital demodulator. Also, that up-down counter can provide a "1" on conductor 238 and a "0" on conductor 240 to indicate that the residual count is zero or a positive number; and it can provide a "1" on conductor 240 and a "0" on conductor 238 to indicate that the residual count is a negative number.

Operation of the Control Logic Circuit: If it is assumed that the up-down counter 22 has a residual count of zero at the midpoint of a given bit time, "0" signals will appear on all of the conductors 220, 222, 224, 226, 228, "1" signals will appear on all of the conductors 230, 232, 234 and 236, a "1" signal will appear on the PLUS conductor 238, and a "0" signal will appear on the MINUS conductor 240. The NAND gate 210 will respond to the "1" signals at the inputs thereof to apply a "0" to the lower input of NAND gate 212 and to the middle input of NAND gate 218, thereby causing those NAND gates to develop "1" signals at the outputs thereof The MINUS conductor 240 will apply a "0" to the lower input of NAND gate 216 and to the upper input of NAND gate 214, thereby causing those NAND gates to develop "1" signals at the outputs thereof. As a result, irrespective of the polarities of the signals on the conductors 100 and 102, which extend from the digital integrator 16, the control logic circuit 24 will apply "1" signals to both of the conductors 242 and 244.

The control logic circuit 24 also will apply "1" signals to both of the conductors 242 and 244 if the residual count is a plus one or a minus one. This means that if the residual count in the up-down counter 22 is zero or plus one or minus one at the midpoint of a given bit time, both of the conductors 242 and 244 will have "1" signals thereon — regardless of the polarities of the signals on the conductors 100 and 102.

If the residual count in the up-down counter 22 is a plus two or more, and if the conductor 102 has a "0" thereon, both of the conductors 242 and 244 will have "0" signals thereon. If the residual count within that up-down counter is plus two or more but the conductor 102 has a "1" thereon, the conductor 242 will have a "0" thereon and the conductor 244 will have a "1" thereon. If the residual count within the up-down counter 22 is a minus two or more, and if the conductor 102 has a "0" thereon, the conductor 242 will have a "0" thereon and the conductor 244 will have a "1" thereon. If the residual count within that up-down counter is a minus two or more but the conductor 102 has a "1" thereon, both of the conductors 242 and 244 will have "0" signals thereon.

It will be noted that both of the conductors 242 and 244 will have "0" signals thereon if the residual count is plus and is two or more and the conductor 102 has a "0" thereon, or if the residual count is minus and is two or more and that conductor has a "1" signal thereon. A residual count of plus two or more and a "0" on the conductor 102 will develop if the waveform of the digital data is essentially positive during the first half of the time base of the digital demodulator and if its time base is leading the time base of the digital demodulator by more than one seventy-fifth of a bit time. A residual count of minus two or more and a "1" on the conductor 102 will develop if the waveform of the digital data is essentially negative during the first half of the time base of the digital demodulator and if its time base is leading the time base of the digital demodulator by more than one seventy-fifth of a bit time. This means that whether the waveform of a bit is essentially positive or essentialy negative during the first half of the time base of the digital demodulator, the control logic circuit 24 will apply "0" signals to both of the conductors 242 and 244 if the time base of that bit leads the time base of that digital demodulator. The conductor 242 will have a "0" thereon and the conductor 244 will have a "1" thereon if the residual count is plus and is two or more and the conductor 102 has a "1" thereon or if the residual count is minus and is two or more and that conductor has a "0" thereon. A residual count of plus two or more and a "1" on the conductor 102 will develop if the waveform of the digital data is essentially negative during the first half of the time base of the digital demodulator and if its time base is lagging the time base of the digital demodulator by more than one seventy-fifth of a bit time. A residual count of minus two or more and a "0" on the conductor 102 will develop if the waveform of the digital data is essentially positive during the first half of the time base of the digital demodulator and if its time base is lagging the time base of the digital demodulator by more than one seventy-fifth of a bit time. It thus should be apparent that whether the waveform of a bit is essentially positive or essentially negative during the first half of the time base of the digital demodulator, the control logic circuit 24 will apply a "0" signal to conductor 242 and a "1" signal to conductor 244 if the time base of that bit is lagging the time base of that digital demodulator.

This means that if a digital bit has the time base thereof congruent with, or phase displaced less than one seventytfifth of a bit time from, the time base of the digital demodulator, the control logic circuit 24 will apply "1" signals to both of the conductors 242 and 244. Further, it means that if a digital bit has the time base thereof lagging the time base of the digital demodulator by more than one seventy-fifth of a bit time, that control logic circuit will apply a "0" signal to the conductor 242 and a "1" to the conductor 244. In addition, it means that if a digital bit has the time base thereof leading the time base of the digital demodulator by more than one seventy-fifth of a bit time, that control logic circuit will apply "0" signals to both of the conductors 242 and 244.

Operation of the Storage and Gating Circuit: The signal which the NAND gate 68, in the digital integrator 16, applies to the conductor 100 is applied to the upper input of flip-flop 110 and to the lower input of NAND gate 144 in the storage and gating circuit 18. The signal which the NAND gate 70 applies to the conductor 102 is applied to the lower input of flip-flop 110, to the uppermost input of NAND gate 138 and to the lower input of NAND gate 146. The signal on the conductor 100 normally is a "0," but it will become a "1" if the bit that is being demodulated has a positive slope at the end of the bit time. The signal on the conductor 102 is the complement of the signal on the conductor 100.

When a message is to be transmitted in digital form, it is customary to transmit synchronizing signals — referred to as the pre-keying portion of the message — before that message is transmitted. In the preferred embodiment of the present invention, the pre-keying portion of the message consists of successive 2,400 Hertz tones which represent digital "1" signals. The digital integrator 16 will respond to each of those 2,400 Hertz tones to apply a "1" to the conductor 100, and hence to the upper input of flip-flop 110 and to the lower input of NAND gate 144 in the storage and gating circuit 18 prior to the midpoint of each bit time. Because the signal on conductor 102 is the complement of the signal on conductor 100, the flip-flop 110 will have a "1" at the upper input thereof and a "0" at the lower input thereof when the variable modulo counter 28 applies a signal to the clock input of that flip-flop, and to the clock inputs of flip-flops 112, 114, 116 and 118, shortly after the end of the third quarter of the bit time. The flip-flop 110 will respond to the "1" and "0" signals at its upper and lower inputs, respectively, and to the signal applied to its clock input, to make the upper output thereof a "1" and to make the lower output thereof a "0."

The flip-flops 110, 112, 114 and 116 in the storage and gating circuit 18 constitute a shift register; and, at any given time, the signals on conductors 122, 124, 126, 128, 130 and 132 will represent the digital values of the last, the second-last, the third-last and the fourth-last digital bits sensed by the digital demodulator. If the last and third-last digital bits sensed by the digital demodulator and clocked into the storage and gating circuit 18, prior to the start of the pre-keying portion of the message, had been digital "1" bits and if the second last and fourth-last digital bits had been digital "0" bits, the conductors 124, 126 and 130 would have "0" signals thereon, and the conductors 122, 128 and 132 would have "1" signals thereon. Those signals would cause the NAND gates 138, 144 and 146 to have "1" outputs but would cause the NAND gate 148 to have a "0" output. Because the outputs of the three NAND gates 144, 146 and 148 are connected together, the "0" output of NAND gate 148 would make the composite signal developed by those NAND gates a "0." This means that if the last and third-last digital bits sensed by the digital demodulator and clocked into the storage and gating circuit 18 had been digital "1" bits and if the second-last and fourth-last digital bits had been digital "0" bits, NAND gate 138 would apply a "1" to the input of NAND gate 142 — and thereby cause that NAND gate to apply a "0" to the upper input of flip-flop 118 — and the NAND gates 144, 146 and 148 would apply a "0" to the lower inputs of NAND gates 266 and 268 in the modulo control 26.

The bits in the pre-keying portion of the message should be digital "1" bits; and, after the first of those bits has been sensed by the digital integrator 16, and after the next pulse has been applied to the clock inputs of flip-flops 110, 112, 114, 116, and 118 of the storage and gating circuit 18, the conductors 124, 128 and 132 will have "0" signals thereon, and the cnductors 122, 126 and 130 will have "1" signals thereon. The second of the digital "1" bits in the pre-keying portion of the message will constitute the third consecutive digital "1" bit applied to the digital demodulator; and the digital integrator 16 will respond to that digital bit to apply a "1" to conductor 100 and a "0" to conductor 102. Those signals will be applied to those conductors during the first half of the bit time corresponding to that second pre-keying digital bit; and hence, even before the conductor 120 can apply a further clocking pulse to the clock inputs of flip-flops 110, 112, 114 and 116, conductors 100, 122, 126 and 130 will have "1" signals thereon and conductors 102, 124, 128 and 132 will have "0" signals thereon. As a result, each of NAND gates 144, 146 and 148 will have a "0" at one input thereof and a "1" at the output thereof, and NAND gate 138 will have at least one "0" at an input thereof, and thus will have a "1" at the output thereof. This means that if three consecutive bits are digital "1" bits, NAND gate 138 will apply a "1" to the input of NAND gate 142 — and thereby cause that NAND gate to apply a "0" to the upper input of flip-flop 118; and the NAND gates 144, 146 and 148 will apply a "1" to the lower inputs of NAND gates 266 and 268 in the modulo control 26.

If the time bases of the digital bits in the pre-keying portion of the message have their time bases phase displaced 180° in either direction from the time base of the waveform 280 in FIG. 3, the digital integrator 16 will sense the negative-going slopes at the ends of the bit times corresponding to those digital bits and will apply "0" signals to conductor 100 and "1" signals to the conductor 102. The shift register in the storage and gating circuit 18 will respond to those signals and to four clocking pulses from the conductor 120 tp cause "0" signals to appear on conductors 122 and 126 and to cause "1" signals to appear on conductors 124, 128, 130 and 132. As a "0" appears on conductor 100 and as a "1" appears on conductor 102, in response to a fifth pre-keying digital bit which has its time base displaced 180° from the time base of waveform 280 in FIG. 3, that "0" and that "1" will coact with the signals on conductors 122, 124, 126, 128, 130 and 132 to make the output of NAND gate 138 a "0" and to make the outputs of each of NAND gates 144, 146 and 148 a "1." The "1" at the outputs of NAND gates 144, 146 and 148 will be applied to the lower inputs of NAND gates 266 and 268 in the modulo control 26 by the conductor 136. The "0" at the output of NAND gate 138 will cause the NAND gate 142 to apply a "1" to the upper input of flip-flop 118; and, during the next transition from "1" to "0" of the signal which conductor 120 will apply to the clock input of that flip-flop, that flip-flop will apply a "0" to the set input of flip-flop 110 and to the variable modulo counter 28. The flip-flop 110 will respond to that "0" to make the upper output thereof "1" and to make the lower input thereof "0" — thereby changing the output of NAND gate 138 back to a "1" and changing the output of NAND gate 142 back to a "0." Because the lower input of the flip-flop 118 is open, it will act as a "1;" and hence that flip-flop 118 will respond to the fall of the next clock pulse to change the "0" at its output to a "1."

In the preceding illustrations, it was assumed that the consecutive digital "1" bits were being transmitted during the pre-keying portion of a message. If three consecutive digital "1" bits were transmitted during or as part of a message, the storage and gating circuit 18 would respond to the resulting third "1" signal on conductor 100 and to the resulting third "0" signal on conductor 102 to apply a "1" to the conductor 136. Further, if three consecutive digital "0" bits were transmitted during or as part of a message, the storage and gating circuit 18 would respond to the resulting first "0" signal on conductor 100, to the resulting first "1" signal on conductor 102, and to the fall of the next clocking pulse on conductor 120 to apply a "1" to conductor 124 and a "0" to conductor 122. That storage and gating circuit would respond to the resulting second "0" signal on conductor 100, to the resulting second "1" signal on conductor 102, and to the fall of the next-succeeding clocking pulse on conductor 120 to apply a "0" to conductors 122 and 126 and a "1" to conductors 124 and 128; and would respond to the resulting third "0" signal on conductor 100 and to the resulting third "1" signal on conductor 102 to enable the NAND gates 144, 146 and 148 to apply a "1" to the conductor 136.

All of this means that the storage and gating circuit 18 will respond to the sensing of alternated digital "1" and digital "0" bits to apply a "1" to conductor 134 — and thus to the variable modulo counter 28 — and to apply a "0" to conductor 136, and thus to the modulo control 26. That storage and gating circuit will respond to three consecutive digital "1" bits or to three consecutive digital "0" bits to apply a "1" to the conductor 136 — and thus to the modulo control 26. That storage and gating circuit will respond to five consecutive 2,400 Hertz tones, which have the time bases thereof displaced 180° from the time base of the waveform 280 in FIG. 3, to apply a "0" to the conductor 134 — and thus to the variable modulo counter.

Operation of the Modulo Control and of the Variable Modulo Counter: The flip-flops 152, 154, 156, 158, 160, 162 and 164 constitute a counting chain which counts up to 128 counts before it starts a further count of 128. However, because the time base of the digital demodulator normally has a duration of 75 counts, and because it is desirable to be able to selectively shorten that time base to 74 counts or to lengthen that time base to 76 counts, the modulo control 26 and the variable modulo counter 28 are interconnected to selectively supply 52, 53 or 54 of the 100 and 28 counts to that counting chain.

When the counting chain of the variable modulo counter 28 is in a state which represents a count of zero, the upper output of each flip-flop 152, 154, 156, 158, 160, 162 and 164 is "0," and the lower output of each of those flip-flops is a "1." At such time, the signals on conductors 94, 184, 188, 192, 196 and 200 will be "1" signals, but the signal on conductor 92 will be a "0" signal; and hence the NAND gate 166 will be applying a "1" signal to conductor 86 — and thus to the digital integrator 16. The signal on conductor 94 will be a "1," but the signal on conductor 96 will be a "0;" and hence flip-flop 150 will be applying a "1" on conductor 204 and a "0" on conductor 202 — and thus will be applying a "1" to the UP input and a "0" to the DOWN input of the up-down counter 22. The signals on conductors 192, 196 and 200 will be "1" signals, but the signals on conductors 92, 96, 186 and 194 will be "0" signals; and hence the NAND gates 172, 174, 176 and 178 will be applying a "0" to conductor 120 — and thus to the storage and gating circuit 18 and to the modulo control 26, while the NAND gates 172, 174 and 180 will be applying a "1" to the conductor 88 — and thus to the digital integrator 16 and to the up-down counter 22. The conductor 92 will be applying a "0" to the middle input of NAND gate 252 and to the upper input of NAND gate 256 in the modulo control 26 — and hence the former NAND gate will be applying a steady "1" to the set input of flip-flop 154, while the latter NAND gate will be applying a steady "1" to the lower input of NAND gate 254.

The conductor 94 will be applying a "1" to the upper input of NAND gate 262 and to the lower input of NAND gate 264; and the conductor 196 will be applying a "1" to the middle input of NAND gate 260. The conductor 198 will be applying a "0" to the upper input of NAND gate 260; and that NAND gate will be co-acting with the NAND gate 258 to apply a "0" to the upper input of flip-flop 246 — thereby enabling that flip-flop to ignore clock pulses applied thereto by the conductor 31. As a result, the upper output of that flip-flop will be applying a steady "0" to the lower input of NAND gate 252 and to the upper input of NAND gate 254, while the lower output of that flip-flop will be applying a steady "1" to the set inputs of flip-flops 156 and 158. If it is assumed that the conductor 136 is applying a "0" to the lower inputs of NAND gates 266 and 268; the former NAND gate will be coacting with NAND gates 262 and 252 to be applying a steady "1" to the set input of flip-flop 154, while the latter NAND gate will be coacting with NAND gates 264 and 256 to be applying a steady "1" to the lower input of NAND gate 254.

Although the conductor 94 will apply a "1" to the lower input of flip-flop 150 at the instant the counting chain of the variable modulo counter 28 assumes the state which represents a zero count, the lower output of that flip-flop will not become a "1" until the conductor 33 applies the next pulse to the clock input of that flip-flop. That conductor applies pulses to that clock input at the rate of nine hundred thousand per second; but, nevertheless, there will be a finite, albeit very short, time interval between the instant conductor 94 applies the "1" to the lower input of flip-flop 150 and the instant when conductor 204 applies a steady "1" to the UP input of the up-down counter 22. This is desirable; because it makes certain that the up-down counter 22 will not start to count until after the start of each time base of the digital demodulator. Although the signal on conductor 33 changes at the rate of 900 kilohertz, that signal merely enables flip-flop 150 to respond to changes in polarity of the signals on conductors 94 and 96, and it does not keep the signals which flip-flop 150 applies to conductors 202 and 204 from being steady signals.

One branch of the branched conductor 34 will be applying pulses to the clock inputs of flip-flops 152 and 154 at the rate of 180,000 per second; and the counting chain of the variable modulo counter 28 will respond to those pulses to start counting toward a count of 128. When that counting chain reaches a count of 16, the signal on conductor 198 will change from "0" to "1;" and, thereupon, NAND gates 260 and 258 will change the upper input of flip-flop 246 from a "0" to a "1." The branched conductor 31 will be applying signals to the clock input of flip-flop 246 at the rate of one million, eight hundred thousand per second; and the negative-going portion of the next of those signals will cause the lower output of that flip-flop to apply a "0" to the set inputs of flip-flops 156 and 158 — thereby causing a "1" to appear at the upper output of each of those flip-flops, and that negative-going portion will cause the upper output of that flip-flop to apply a "1" to the upper input of NAND gate 254, thereby causing that NAND gate to apply a "0" to the set input of flip-flop 152 — with the consequent development of a "1" at the upper output of the latter flip-flop. The "1" at the upper output of flip-flop 152 serves to add one count to the count within the counting chain, the "1" at the upper output of flip-flop 154 serves to add four counts to the count within that counting chain, and the "1" at the upper output of flip-flop 156 serves to add eight counts to the count within that counting chain. The one and eight-tenths megahertz signal which the conductor 31 applies to the clock input of flip-flop 246 will enable the "0" signals at the set inputs of flip-flops 152, 156 and 158 to appear and disappear so rapidly that those signals will not keep those flip-flops from changing state when the next pulses are applied to the clock inputs thereof. In this way, the control modulo 26 keeps the counting chain from missing any counts. As the upper output of flip-flop 158 becomes a "1," the lower output will become a "0;" and the resulting "0" signal at the middle input of NAND gate 260 will enable that NAND gate to coact with NAND gate 258 to again apply a steady "0" to the upper input of flip-flop 246 — with a consequent restoration of the "1" at the lower output of that flip-flop. All of this means that as the counting chain reached a count of 16, the variable modulo counter 28 and the modulo control 26 coacted to add 13 counts to that counting chain, and to again apply steady "1" signals to the set inputs of flip-flops 152, 156 and 158.

When the count within the counting chain of the varable modulo counter 28 reaches 32, the flip-flop 162 will cause the signal on conductor 96 to change from "0" to "1;" and will cause the signal on conductor 94 to change from "1" to "0." The NAND gate 262 will respond to the resulting application of "0" to the upper input thereof to apply a "1" to the upper input of NAND gate 252; but the continued "0" on conductor 92 will force the latter NAND gate to continue to apply a steady "1" to the set input of flip-flop 154. The NAND gate 264 will respond to the application of "0" to the lower input thereof to apply a "1" to the lower input of NAND gate 256; but the latter NAND gate will coact with NAND gate 254 and flip-flop 246 to maintain a steady "1" at the set input of flip-flop 152. Moreover, the steady "0" on conductor 198 will enable NAND gates 260 and 258 and flip-flop 246 to maintain a steady "1" at the set inputs of flip-flops 156 and 158. As a result, the change from a "1" to a "0" on conductor 94 does not have any immediate effect upon the count within the counting chain. However, the change from "0" to "1," which occurs on conductor 96 as the count within the counting chain reaches 32 will enable the "fall" of the next pulse that is applied to the clock input of flip-flop 150 to change the upper output of that flip-flop from "0" to "1." The resulting application of a "1" to the DOWN input of the up-down counter 22 by the conductor 202 will cause that up-down counter to start counting down.

When the count within the counting chain reaches 48, the signal on conductor 198 will again change from "0" to "1;" and thereupon, as explained hereinbefore when the count reached sixteen, the modulo control 26 and the variable modulo counter 28 will coact to apply "0" signals to the set inputs of flip-flops 152, 156 and 158 — thereby adding thirteen counts to the counting chain. Almost immediately thereafter, that modulo control and that variable modulo counter will coact to re-apply steady "1" signals to those set inputs. When the count within the counting chain reaches 64, the signal on conductor 92 will change from "0" to "1;" and thereupon, the output states of NAND gates 252 and 254 will be determined by the signals on conductors 94, 196 and 198. Because the conductor 198 has a "0" thereon, the lower output of the flip-flop 246 will continue to apply a steady "1" to the set inputs of flip-flops 156 and 158. The upper input of that flip-flop will continue to apply a "0" to the lower input of NAND gate 252 and to the upper input of NAND gate 254 — with consequent continued application of steady "1" signals to the set inputs of flip-flops 152 and 154. As a result, the change from a "0" to a "1" on the conductor 92 does not have any immediate effect upon the count within the counting chain.

However, as the count reaches 64, the signal on conductor 90 will change from "1" to "0," and hence the NAND gate 72 in the digital integrator 16 will develop a steady "1" at the output thereof; and that steady "1" will halt the application of further pulses to the up-down counter 22 via conductor 104. As a result,that up-down counter will stop counting, and will come to rest until the beginning of the next time base of the digital demodulator. Further, as that count reaches 64, the conductor 94 will apply a "1" to the upper input of NAND gate 262 and to the lower input of NAND gate 264. As pointed out hereinbefore, the conductor 92 will, at this time, be applying a "1" to the middle input of NAND gate 252, and to the upper input of NAND gate 256. This means that NAND gates 252, 256, 262 and 264 will be able to coact with NAND gates 266, 268, 270, 272 and with flip-flops 248 and 250 to determine whether there is any need to adjust the time base of the variable modulo counter 28. Specifically, prior to the time the count within the counting chain reached 64, the "0" signals at the middle input of NAND gate 252 and at the upper input of NAND gate 256 kept NAND gates 262, 264, 266, 268, 270 and 272 and flip-flops 248 and 250 from affecting the signals at the outputs of NAND gates 252 and 254. However, as the "0" signal on conductor 92 changes to a "1," and thereafter until the signal which conductor 94 applies to the upper input of NAND gate 262 and to the lower input of NAND gate 264 changes back to "0" — as it will when the count reaches 96 — the NAND gates 252 and 256 will be able to respond to signals from the NAND gates 262, 264, 266, 268, 270 and 272 and flip-flops 248 and 250.

If it is assumed that the signals on conductors 242 and 244 are "1" signals — as they will be if the time base of the digital bit being sensed by the digital integrator 16 is congruent with the time base of the digital demodulator, and if it is assumed that the signal on conductor 136 is a "1" — as it will be if that digital bit is the third or more consecutive digital bit having the same digital value, the flip-flop 248 will have a "1" at the lower input thereof and a "0" at the upper input thereof, and the flip-flop 250 will have a "1" at the upper input thereof and a "0" at the lower input thereof. Also, the NAND gates 266 and 268 will have "1" signals applied to the lower inputs thereof. However, the flip-flops 248 and 250 will not be able to respond to the signals at the inputs thereof until a pulse is applied to the clock inputs thereof by conductor 120.

As the count within the counting chain reaches 64, "1" signals will appear on all of conductors 92, 94, 184, 188, 192, 196 and 200; and those signals will cause the conductor 86 to apply a negative-going pulse to the expander 66 and to the re-set inputs of the flip-flops 54, 56, 58, 60 and 62 in the digital integrator. Shortly before the count within the counting chain of the variable modulo counter 28 reaches 65, the "0" on conductor 86 will change back to a "1."

When the count in the counting chain reaches 80, the signal on conductor 198 will again change from "0" to "1;" and if "1" signals had been applied to the conductors 242 and 244 during the preceding bit time, the modulo control 26 and the variable modulo counter 28 will coact to add thirteen counts to the counting chain. Specifically, the conductor 92 will be applying a "1" to the middle input of NAND gate 252 and to the upper input of NAND gate 256; and the conductor 94 will be applying a "1" to the upper input of NAND gate 262 and to the lower input of NAND gate 264. The NAND gate 270 and the flip-flop 248 would have responded to the "1" on conductor 244 and to the clock pulse on conductor 120 during the preceding bit time to develop a "0" at the output of that flip-flop; and, similarly, NAND gate 272 and flip-flop 250 would have responded to the "1" on conductor 242 and to the clock pulse on conductor 120 during the preceding bit time to develop a "0" at the output of that flip-flop. The resulting "0" signals at the upper input of NAND gate 266 and at the upper input of NAND gate 268, respectively, enable those NAND gates to apply "1" signals to the lower input of NAND gate 262 and to the upper input of NAND gate 264, respectively. Those "1" signals will coact with the "1" signals applied to those NAND gates by conductor 94 to cause NAND gate 262 to apply a "0" to the upper input of NAND gate 252 and to cause NAND gate 264 to apply a "0" to the lower input of NAND gate 256. NAND gate 252 will respond to the "0" at its upper input to maintain a steady "1" on the set input of flip-flop 154; but NAND gate 254 will respond to the "1" from NAND gate 256 and to the "1," which will appear on the upper output of flip-flop 246 as a pulse is applied to the clock input of that flip-flop, to apply a "0" to the set input of flip-flop 152. The lower input of flip-flop 246 will apply a "0" to the set inputs of flip-flops 156 and 158 as that pulse is applied to the clock input of the former flip-flop. All of this means that flip-flop 152 will add one count, flip-flop 156 will add four counts, and flip-flop 158 will add eight counts — a total of thirteen counts — to the count within the counting chain.

At the time the count reaches 96, the signal on conductor 94 will become a "0;" and that signal will cause NAND gates 262 and 264 to develop steady "1" signals at the outputs thereof. Those "1" signals will keep the signals from the NAND gates 266, 268, 270 and 272 and from the flip-flops 248 and 250 from affecting the signals at the outputs of NAND gates 252 and 254 and at the outputs of flip-flop 246.

When the count within the counting chain reaches 98, the conductors 92, 96, 186, 192, 196 and 200 will have "1" signals thereon; and hence the NAND gates 172, 174, 176 and 178 will apply a positive-going pulse to the conductor 120. That pulse will be applied to the clock inputs of the flip-flops 110, 112, 114, 116 and 118 in the storage and gating circuit 18, and also to the clock inputs of flip-flops 248 and 250 in the modulo control 26. Because all of those flip-flops require negative-going edges at the clock inputs thereof, the application of the positive-going pulse to conductor 120 has no immediate effect. However, as the count within the counting chain reaches 100, the signal on conductor 186 will change from a "1" to a "0;" and hence the conductor 120 will apply the fall of its signal to the clock inputs of the flip-flops in the storage and gating circuit 18 and also to the clock inputs of the flip-flops 248 and 250. The flip-flop 248 will respond to that fall to cause the signal which appears at the upper input thereof to appear at the upper input of NAND gate 266; and the flip-flop 250 will respond to that fall to cause the signal which appears at the lower input thereof to appear at the upper input of NAND gate 268.

When the count within the counting chain reaches 106, the conductors 92, 96, 186, 192, 194 and 200 will have "1" signals thereon; and hence the NAND gates 172, 174 and 180 will coact to apply a negative-going signal to the conductor 88 — and thus to the digital integrator 16 and to the re-set input of the up-down counter 22. As the count within the counting chain reaches one hundred and eight, the "1" on the conductor 186 will change back to a "0;" and hence the NAND gate 180 will change the "0" on the conductor 88 back to a "1."

When the count within the counting chain of the variable modulo counter 28 reaches one hundred and twelve, the signal on conductor 198 will again change from "0" to "1;" and, thereupon, the modulo control 26 and the variable modulo counter 28 will co-act to add fourteen, rather than thirteen, counts to the counting chain. Specifically, the conductor 92 will be applying a "1" to the middle input of NAND gate 252 and to the upper input of NAND gate 256; and the conductor 94 will be applying a "0" to the upper input of NAND gate 262 and to the lower input of NAND gate 264. The resulting "1" signal at the output of NAND gate 262 will be applied to the upper input of NAND gate 252; and the "1" signal at the lower input of NAND gate 256 will coact with the "1" signal at the upper input of that NAND gate to cause that NAND gate to apply a "0" signal to the lower input of NAND gate 254. This means that the upper and middle inputs of NAND gate 252 will have "1" signals applied thereto, and that the lower input of NAND gate 254 will have a "0" signal applied thereto. Consequently, when the flip-flop 246 responds to a pulse at the clock input thereof to apply a "1" to NAND gates 252 and 254 and to apply a "0" to the set inputs of flip-flops 156 and 158; the NAND gate 252 will apply a "0" to the set input of flip-flop 154, but NAND gate 254 will apply a "1" to the set input of flip-flop 152. All of this means that flip-flop 154 will add two counts, flip-flop 156 will add four counts, and flip-flop 158 will add eight counts — a total of fourteen counts — to the count within the counting chain.

The flip-flop 158 will develop a "0" at the lower output thereof, as the upper output of that flip-flop adds eight counts to the counting chain. The resulting application of a "0" to the upper input of flip-flop 246, by the NAND gates 260 and 258, will cause the lower output of that flip-flop to re-apply a steady "1" to the set inputs of flip-flops 156 and 158, and to cause the upper output of that flip-flop to re-apply a steady "0" to the lower input of NAND gate 252 and to the upper input of NAND gate 254.

When the count within the counting chain reaches 127, the next-succeeding pulse that is applied to the clock inputs of flip-flops 152 and 154 will enable that counting chain to assume the state which represents zero, and will enable that counting chain to again start counting toward 128.

The time interval between the instant when the counting chain is in its zero state and the instant when that counting chain is again in that state is the time base of the digital demodulator. Because the modulo control 26 and the variable modulo counter 28 coacted to add 13, 13, 13 and 14 counts — a total of fifty-three counts — to the counting chain, that counting chain required only 75 of the 180 kilohertz pulses from branched conductor 34 to count from zero to 128. As a result, the time base of that counting chain was 75 of those pulses, and it had a duration of slightly more than four ten-thousandths of a second.

The "1" signals on the conductors 242 and 244, which were sensed during the portion of the bit time between counts 64 and 96, indicated that the residual count within the up-down counter 22 was a zero, a plus one or a minus one — and thus indicated that the time base of the digital demodulator was congruent with or was phase displaced one seventy-fifth of a bit time or 180° from the time base of the digital bit that was being sensed. If the residual count within the up-down counter 22 had been plus two or more and if the digital bit that had been sensed had been a digital "1," or if the residual count within that up-down counter had been minus two or more and if the digital bit that had been sensed had been a digital "0," both of the conductors 242 and 244 would have had "0" signals thereon. Those signals would have enabled the flip-flops 248 and 250 to develop "1" signals at the outputs thereof when the fall of the pulse on conductor 120 was applied to the clock inputs of those flip-flops as the count of the counting chain reached 100. During the third quarter of the next-succeeding bit time, the conductor 92 would apply a "1" to the NAND gates 252 and 254, the conductor 94 would apply a "1" to the NAND gates 262 and 264, the flip-flop 248 would apply a "1" to the NAND gate 266, the flip-flop 250 would apply a "1" to the NAND gate 268,and the conductor 136 would apply a "1" to the NAND gates 266 and 268 if the digital bit being sensed had the same digital value as the two preceding digital bits. The NAND gates 266 and 268 would apply "0" signals to NAND gates 262 and 264, respectively; and hence NAND gate 262 would apply a "1" to NAND gate 252, while NAND gate 264 would apply a "1" to NAND gate 256 — thereby causing the latter NAND gate to apply a "0" to NAND gate 254. When the upper output of flip-flop 246 responds to the "1" on conductor 198 — which develops at count 80 — to apply a "1" to NAND gates 252 and 254, the former NAND gate will apply a "0" to the set input of flip-flop 154 but the latter NAND gate will apply a "1" to the set input of flip-flop 152. The flip-flops 156 and 158 have "0" signals applied to the set inputs thereof as the lower output of flip-flop 246 becomes "0;" and hence flip-flop 154 would add two counts, flip-flop 156 would add four counts, and the flip-flop 158 would add eight counts — a total of fourteen counts — to the counting chain. In such event, the modulo control 26 and the variable modulo counter 28 would add 13, 13, 14 and 14 counts — a total of 54 counts to the counting chain. This means that just 74 pulses from the branched conductor 34 were needed to enable that counting chain to count from zero to 128. The resulting shorter time base for the digital modulator enables that time base to shift one seventy-fifth of a bit time toward the time base of the previously sensed digital bit.

If the residual count within the up-down counter 22 had been plus two or more and if the digital bit that had been sensed had been a digital "0," or if the residual count within that up-down counter had been minus two or more and if the digital bit that had been sensed had been a digital "1," the up-down counter 22 and the control logic circuit 24 would have developed a "0" on conductor 242 and a "1" on conductor 244. Flip-flop 248 would have responded to the "1" on conductor 244 to develop a "0" at the output thereof on the fall of the next pulse applied to its clock input by conductor 120; and flip-flop 250 would have responded to the "0" on conductor 242 to develop a "1" at its output on that fall. The resulting "0" at the upper input of NAND gate 266 would cause that NAND gate to apply a "1" to the NAND gate 262 — with a consequent application of a "0" to the upper input of NAND gate 252. The flip-flop 250 would apply a "1" to the upper input of NAND gate 268; and that "1" would coact with the "1" conductor 136 to cause NAND gate 268 to apply a "0" to NAND gate 264 — with consequent application of a "1" to NAND gate 256. The latter NAND gate would apply a "0" to NAND gate 254; thereby causing a "1" to appear on conductor 276. When flip-flop 246 changes state in response to the "1" which develops on conductor 198 at count eighty, that flip-flop will apply a "0" to the set inputs of flip-flops 156 and 158 but NAND gate 252 will continue to apply a steady "1" to the set input of flip-flop 154 and NAND gate 254 will continue to apply a steady "1" to the set input of flip-flop 152. Consequently, flip-flop 156 will add four counts and flip-flop 158 will add eight counts — a total of 12 counts — to the counting chain. In such event, the modulo control 26 and the variable modulo counter 28 would add 13, 13, 12 and fourteen counts — a total of 52 counts to the counting chain. This means that 76 pulses from the branched conductor 34 were needed to enable that counting chain to count from zero to 128. The resulting longer time base for the digital demodulator enables that time base to shift one seventy-fifth of a bit time toward the time base of the previously sensed digital bit.

It thus should be apparent that the modulo control 26 can coact with the variable modulo counter 28 to selectively apply 52, 53 or 54 counts to the counting chain during any given bit time. The application of 53 counts in the counting chain will make the modulo of the variable modulo counter 75; and that modulo will not cause that counting chain to shift the time base of the digital demodulator relative to the time base of the digital data that is being sensed. However the application of 52 counts will make the modulo of the variable modulo counter 76, and that modulo will cause the counting chain to shift the time base of the digital demodulator in one direction relative to the time base of the digital data that is being sensed; and the application of 54 counts will make the modulo of the variable modulo counter 74, and that modulo will cause that counting chain to shift the time base of the digital demodulator in the opposite direction relative to the time base of the digital data that is being sensed.

The modulo control 26 will coact with the variable modulo counter 28 to chek the phase relation of the time base of the digital demodulator to the time base of each digital bit which is the third or more of a succession of digital bits having the same digital value. Such digital bits are found during, and as parts of, digital messages, as well as during the pre-keying portion of the message; hence that phase relation is checked, and where necessary is corrected, during, as well as prior to, the transmission of digital messages. Consequently, the digital demodulator of the present invention avoids the problems which drift and phase shifts cause in the demodulation of long digital messages by prior demodulators of digital data.

The maximum phase displacement between the time base of the digital demodulator and the time base of any digital bit is 38 pulses of the 180 kilohertz signal on the branched conductor 34; and most phase displacements will be smaller than the maximum phase displacement. Becaust the modulo control 26 can coact with the variable modulo counter 28 to shift the time base of the digital demodulator toward the time base of a digital bit, which is the third or more of a succession of digital bits having the same digital value, at the rate of one thirty-eighth of that time base, and because digital bits are applied to the digital dimodulator at the rate of 2400 per second, the digital demodulator can quickly eliminate any phase displacements. The up-down counter 22 and the control logic circuit 24 will coact to sense the magnitude and direction of any phase displacement which is less than the maximum phase displacement, and the modulo control 26 will coact with the variable modulo counter 28 to eliminate that phase displacement.

The up-down counter 22 and the control logic circuit 24 will be unable to sense a maximum phase displacement, because such a phase displacement will leave a residual count of zero in that up-down counter. However, any maximum phase displacement during the pre-keying portion of a message will be sensed by the storage and gating circuit 18 and will be promptly eliminated by the variable modulo counter 28. Specifically, if during the pre-keying portion of a message — when only digital "1" bits are transmitted — the shift register in the storage and gating circuit senses a 180° phase shift of five consecutive digital bits — as by developing "1" signals on all of conductors 124, 128, 130 and 132 and by receiving a further "1" signal on conductor 102, the NAND gates 138 and 142 and flip-flop 118 will apply a "0" to conductor 134 at the hundredth count of the counting chain in the variable modulo counter 28. That "0" will be applied to the lower input of NAND gate 182 and to the upper input of the two-input AND gate which constitutes the lower input of the flip-flop 164 in the variable modulo counter 28. That "0" will remain on the conductor 134 until the next pulse is applied to the conductor 120 by NAND gate 178 of that variable modulo counter; and hence that "0" will remain on conductor 134 throughout the rest of the bit time of the digital bit which is being sensed.

Close to the end of that bit time, a "0" will appear on the conductor 96; and that "0" will "clock" the flip-flop 164. The "0" which is still present on the conductor 134 will cause the two-input AND gate to apply a "0" to the lower input of that flip-flop; but the "0" on that conductor will cause NAND gate 182 and the upper AND gate to apply a "1" to the upper input of that flip-flop. As a result, the flip-flop 164 will respond to the clocking thereof to cause the signal on conductor 92 to continue to be a "1;" and that "1" will represent 64 counts within the counting chain. Consequently, only 38, of the 180 kilohertz pulses applied by the branched conductor 34, will be needed to cause the counting chain to count to 128. Those pulses will be supplied to that counting chain during the first half of the next-succeeding bit time; and hence the time base of the digital demodulator will be shifted 180° relative to the time base of the digital data which is being sensed — thereby making those time bases congruent.

When the lower output of flip-flop 118 in the storage and gating circuit 18 applied a "0" to the conductor 134, it also applied a "0" to the set input of flip-flop 110 in that storage and gating circuit. The latter flip-flop responded to that "0" to immediately change the upper output thereof to a "1" and the lower output thereof to a "0." Thereupon, NAND gate 138 changed the output thereof to a "1" and NAND gate 142 applied a "0" to the upper input of flip-flop 118. Consequently, when the conductor 120 applied a negative-going pulse to the clock input of that flip-flop, at count 100 of that next-succeeding bit time, the "0" on conductor 134 changed to a "1." The NAND gate 182 would respond to that "1" and to the "1" applied to the upper input thereof by conductor 92 to apply a "0" to the upper AND gate; but the lower AND gate would receive the "1" from conductor 134 and a "1" from conductor 92. The resulting application of a "0" to the upper input and of a "1" to the lower input of flip-flop 164 will enable that flip-flop to respond to a clocking pulse from flip-flop 162 to apply a "0" to conductor 92 and a "1" to conductor 90.

In this way, the storage and gating circuit 18 and the variable modulo counter 28 coact to sense a maximum phase displacement of the time base of the digital demodulator and to eliminate that phase displacement during the next bit time. Further, that storage and gating circuit automatically responds to the sensing of three consecutive digital bits of equal digital value to enable the modulo control 26 and the variable modulo counter 28 to provide the 74, 75 or 76 modulo which is needed for the counting chain of that variable modulo counter. All of this means that the modulo control 26 and the variable modulo counter 28 will respond to appropriate signals from the storage and gating circuit 18 and from the control logic circuit 24 to sense and quickly eliminate all phase displacements greater than one seventy-fifth of a bit time. Consequently, the digital demodulator of the present invention is able to virtually eliminate errors due to phase shift and drift.

Summary of Operation of Digital Demodulator: The analog filter 10 will receive the digital data, will attenuate noise, electrical transients and signals having frequencies above 4800 Hertz, and will apply the filtered data to the squaring circuit 12. That circuit will provide steep sides and flat tops and flat bottoms for the digital bits; and the digital filter 14 will filter out substantially all high frequency noise and electrical transients.

The digital integrator 16 will count the number of 180 kilohertz pulses which it receives during that portion of the third quarter of a given bit time when the digital data is negative, and also will count the number of those pulses which it receives during that portion of the first half of the next-succeeding bit time when the digital data is positive. That digital integrator will respond to the total count therein to apply "1" and "0" signals to the conductor 20 during the third quarter of the given bit time and during the first and second quarters of the succeeding bit time which will indicate the polarity of the digital bit which is being sensed. Also, that digital integrator will apply signals to the storage and gating circuit 18 and to the control logic circuit 124 which will indicate the polarity of the digital bit which is being sensed. in addition, that digital integrator will apply driving pulses to the up-down counter 22 whenever any portion of a digital bit is positive during the first half of the corresponding bit time.

The storage and gating circuit 18 will, whenever three successive bits have the same digital value, apply a "1" to the conductor 136; but it will apply a "0" to that conductor when digital "1" and digital "0" bits are alternated. Further, that storage and gating circuit will apply a negative-going signal to the conductor 134 in the event five 2400 Hertz tones have the time bases thereof phase-displaced 180° in either direction from the time base of the digital demodulator.

The control logic circuit 24 will respond to the signals from the digital integrator 16 and to signals from the up-down counter 22 to apply signals to conductors 242 and 244 which will indicate the existence and nature of any phase displacement. Specifically, that control logic crcuit will apply signals to those conductors which will indicate whether the time base of the digital demodulator is phase displaced from the time base of the digital data by plus two or more, is phase displaced from that time base by minus two or more, or is phase displaced from that time base by less than two.

The modulo control 26 and the variable modulo counter 28 will coact to add an average of 53 counts to the counting chain of that variable modulo counter during each bit time — thereby reducing from 128 to an average of 75 the number of 180 kilohertz pulses which must be applied to that counting chain during each bit time. In addition, that modulo control and that variable modulo counter will coact with signals from the storage and gating circuit 18 and from the control logic circuit 24 to selectively change the time base of the digital demodulator from 75 counts to 74 counts or to 76 counts. In doing so, that modulo control and that variable modulo counter will enable the digital demodulator to shift its time base into register with the time base of the digital data being sensed.

The overall result is that the digital demodulator of the present invention virtually eliminates the drift and phase shift which occurs when digital data is demodulated by analog techniques. Moreover, that digital demodulator utilizes fewer and less-expensive components than are required where digital data is demodulated by analog techniques. Further, that digital demodulator requires no adjustments.

Conclusion: The digital demodulator provided by the present invention is very useful in demodulating digitally encoded very high frequency (VHF) radio signals; but it could be used to demodulate digitally encoded radio signals in any desired part of the radio frequency spectrum. Moreover, if desired, that digital demodulator could be used to demodulate wired digital data.

In the preferred embodiment of the present invention, the timing pulses are integrated by the digital integrator 16 during three-quarters of each bit time. If desired, that embodiment could be modified so those timing pulses could be integrated by that digital integrator for a period as short as one-half of a bit time or for a period as long as an entire bit time. Integration of the timing pulses for an entire bit time would be practical only where the maximum anticipated differential phase delay between the 1200 and 2400 Hertz tones was essentially zero.

The digital demodulator provided by the present invention is particularly useful in the demodulation of data which is encoded by continuous phase, frequency shift keying. However, that digital demodulator could be made to demodulate digital data which was encoded in other ways. For example, that digital demodulator could be made to demodulate digital data which was encoded by phase shift keying.

In the said one preferred embodiment of the present invention, the slope at the end of each bit time determines whether the corresponding bit constitutes a digital "1" or a digital "0." Specifically, if the slope of a bit at the end of its bit time is positive-going, that bit is considered to be a digital "1," but if that slope is negative-going, that bit is considered to be a digital "0." If desired, the digital demodulator of the present invention could be arranged to sense the polarity of digital data wherein a negative-going slope at the end of a bit time represented a digital "1" and a positive-going slope represented a digital "0." Further, the digital demodulator of the present invention could be arranged to sense the polarity of digital data wherein each 2400 Hertz tone represented a digital "1" and each twelve hundred Hertz tone represented a digital "0." Conversely, that digital demodulator could be arranged to sense the polarity of digital data wherein each 2400 Hertz tone represented a digital "0" and each twelve hundred Hertz tone represented a digital "1."

The storage and gating circuit 18 is arranged to apply a "1" to the conductor 136 only after the flip-flops 110 and 112 develop the same signals at the upper outputs thereof and the digital integrator 16 then applies a similar signal to conductor 100. Those flip-flops will develop such signals and that conductor will receive such a signal only after the digital integrator 16 has sensed three consecutive bits which have the same digital value and whose time bases are equal to the time base of the digital demodulator. In this way, the present invention makes certain that the digital demodulator enables the modulo control 26 and the variable modulo counter 28 to change the modulo of that digital demodulator only when that digital integrator is sensing a bit which has a time base equal to that of the digital demodulator. If desired, of course, the storage and gating circuit 18 could be arranged to apply a "1" to conductor 136 only after four or more consecutive bits of the same digital value had been sensed.

The storage and gating circuit 18 of the digital demodulator of the present invention develops a "0" at the output of NAND gate 138 if five consecutive digital "0" bits are sensed by the digital integrator 16. If it were desirable for the digital demodulator to demodulate data messages which were expected to have five or more consecutive digital "0" bits therein, additional flip-flops could be added to the counting chain of the storage and gating circuit 18. In that way, the total number of consecutive digital "0" bits that would have to be applied to the digital demodulator to cause the storage and gating circuit 18 to develop a "0" at the output of NAND gate 138 could be made greater than the greatest number of anticipated consecutive digital "0" bits during a data message.

Further, if desired, an inhibiting circuit could be provided which would apply an inhibiting signal to an input terminal of expander 140, in the storage and gating circuit 18, during the data portion of the message. Where such an inhibiting circuit was used, the gating and storage circuit 18 would develop a "0" signal at the output of NAND gate 138 only during the pre-keying portion of the message; and hence that storage and gating circuit would not develop such a signal even if more than five consecutive digital "0" bits were sensed during the data portion of a message.

The NAND gates 68 and 70 in the digital integrator 16 simulate a flip-flop and act as a "memory." Specifically, those NAND gates will respond to the developing of a "0" at the output of NAND gate 64 to apply a "1" signal to conductor 100 and a "0" signal to conductor 102; and those NAND gates will continue to apply those signals to those conductors even if additional pulses on conductor 98 cause the counting chain to permit the output of NAND gate 64 to again become a "1." Not until the conductor 88 applies a "0" to the lower input of NAND gate 70 will the NAND gates 68 and 70 permit the signals on conductors 100 and 102 to change. The NAND gates 68 and 70 consitute an inexpensive and effective memory; but, if desired, a flip-flop or other type of memory could be used in lieu of NAND gates 68 and 70.

Whereas the drawing and accompanying description have shown and described a preferred embodiment of the present invention, it should be apparent to those skilled in the art that various changes may be made in the form of the invention without affecting the scope thereof.

What we claim is:

1. A digital demodulator which can receive and demodulate data composed of bits that have positive-going and negative-going portions and which comprises means responsive to said data to develop a first signal during the time a digital bit is positive and to develop a second signal during the time said digital bit is negative, a source of pulses, and a digital integrator that counts pulses from said source of pulses during a predetermined length of time if said means is developing said first signal during said predetermined length of time and that counts pulses from said source of pulses during a second predetermined length of time if said means is developing said second signal during said second predetermined length of time, said digital integrator developing an output which indicates that said digital bit is a digital "1" if the total number of said pulses counted by said digital integrator during the first said and said second predetermined lengths of time falls within a pre-set range, said digital integrator developing a second output which indicates that said digital bit is a digital "0" if the total number of said pulses counted by said digital integrator during the first said and said second predetermined lengths of said time falls outside of said pre-set range.

2. A digital demodulator as claimed in claim 1 wherein said means is a digital filter which receives pulses having durations shorter than said bit time, and wherein said filter rejects noise and electrical transients having durations shorter than the duration of a pulse.

3. A digital demodulator as claimed in claim 1 wherein said means includes a storage element which receives said data, an inverting element which receives said data, a second storage element which receives inverted data from said inverting element, a third storage element which selectively develops the first said signal and said second signal, an intermediate element which responds to said first said signal from said third storage element and to the output of the first said storage element to apply a signal to one input of said third storage element, and a second intermediate element which responds to said second signal from said third storage element and to the output of said second storage element to apply a signal to a second input of said third storage element.

4. A digital demodulator as claimed in claim 1 wherein said means includes a storage element which receives said data, an inverting element which receives said data, a second storage element which receives inverted data from said inverting element, a third storage element which selectively develops the first said signal and said second signal, an intermediate element which responds to said first said signal from said third storage element and to the output of the first said storage element to apply a signal to one input of said third storage element, a second intermediate element which responds to said second signal from said third storage element and to the output of said second storage element to apply a signal to a second input of said third storage element, and wherein the first said and said second and said third storage elements have clock inputs that are connected together, whereby all of said storage elements are "clocked" simultaneously.

5. A digital demodulator as claimed in claim 1 wherein said digital integrator includes a counter which can count pulses to a value within said pre-set range and thereby cause the first said output to be established, and wherein said digital integrator includes a memory which will maintain said first said output even if the total of said pulses exceeds said value.

6. A digital demodulator as claimed in claim 1 wherein said digital integrator includes a gate which receives the first said signal and also receives pulses from said source of pulses and which will pass said pulses only when said first said signal is present, and wherein said digital integrator includes a second gate which receives said second signal and also receives pulses from said source of pulses and which will pass said pulses only when said second signal is present.

7. A digital demodulator as claimed in claim 1 wherein said digital integrator includes a counter which can count pulses to a value within said pre-set range and thereby cause the first said output to be established, wherein said digital integrator includes a memory which will maintain said first said output even if the total of said pulses exceeds said value, and wherein said memory includes a NAND gate with one input thereof connected to receive a signal when said counter counts pulses to said value within said pre-set range and also includes a second NAND gate which has one input thereof connected to the output of the first said NAND gate and which has the output thereof connected to a second input of said first said NAND gate.

8. A digital demodulator as claimed in claim 1 wherein the first said predetermined length of time occurs during one bit time, and wherein said second predetermined length of time occurs during a contiguous bit time, whereby said digital integrator determines the digital value of said digital bit by counting pulses which precede and succeed the end of the bit time corresponding to said digital bit.

9. A digital demodulator as claimed in claim 1 wherein one of said predetermined lengths of time is shorter than one-half of a bit time but is at least as long as one-quarter of said bit time, and wherein the other of said predetermined lengths of time is longer than said one predetermined length of time.

10. A digital demodulator which can receive and demodulate digital data and which comprises means to establish a time base for said digital demodulator, second means to sense the relation of said time base for said digital demodulator to the time base of said digital data, and third means to vary said time base for said digital demodulator to cause said time base to move into register with said time base of said digital data.

11. A digital demodulator as claimed in claim 10 wherein fourth means senses the relation of said time base for said digital demodulator to the time base of each bit of digital data but varies said time base for said digital demodulator only in response to a displacement between said time base for said digital demodulator and the time base of a bit of digital data which has a time base equal to that of said digital demodulator.

12. A digital demodulator as claimed in claim 10 wherein said first means includes a counting chain with a selectively variable modulo.

13. A digital demodulator as claimed in claim 10 wherein said first means includes a plurality of flip-flops that are connected as a counting chain, and wherein some of said flip-flops have direct-set inputs to which signals can be applied to add counts to said counting chain.

14. A digital demodulator as claimed in claim 10 wherein a source of pulses applies pulses to said second means when said digital data has a predetermined digital value, wherein said second means has a counter which counts the number of said pulses during a predetermined portion of each bit time, and wherein said second means develops a predetermined signal if the count in said counter falls within a predetermined range.

15. A digital demodulator which can receive and demodulate digital data and which comprises a digital filter, digital means that acts during the pre-keying portion of a message to place the time base of said digital demodulator in phase with the time base of said digital data, and digital means that senses the digital value of said digital data.

16. A digital demodulator as claimed in claim 15 wherein the first said digital means varies the time base of said digital demodulator to place it in phase with said time base of said digital data.

17. A digital demodulator as claimed in claim 15 wherein digital means repeatedly determines whether the time base of said digital demodulator is in synchronism with the time base of said digital data during the data portion of said message.

18. A digital demodulator as claimed in claim 15 wherein digital means repeatedly determines whether the time base of said digital demodulator is in synchronism with the time base of said digital data during the data portion of said message and wherein the first said digital means acts during the data portion of said message to place said time base of said digital demodulator in synchronism with said time base of said digital data.

19. A digital demodulator as claimed in claim 15 wherein digital means determines whether the time bases of said digital demodulator and of said digital data are in synchronism, and wherein said time base of said digital demodulator is varied if said time bases of said digital demodulator and of said digital data are not in synchronism.

20. A digital demodulator which comprises a digital filter that rejects high frequency noise and electrical transients, means to subdivide each bit of digital data into a number of short pulses, and digital means to integrate said pulses and to indicate whether a digital bit is a digital "1" or a digital "0" according to the number of pulses integrated thereby.

21. A digital demodulator as claimed in claim 20 wherein some of said pulses are integrated during the positive-going portion of said digital bit, and wherein other of said pulses are integrated during the negative-going portion of said digital bit.

22. A digital demodulator as claimed in claim 20 wherein some of said pulses are integrated during one bit time, wherein other of said pulses are integrated during the next-succeeding bit time, and wherein the slope of a bit at the end of a bit time determines whether that bit was a digital "1" or a digital "0."

23. A digital demodulator comprising means to determine the polarity of digital bits, and further means sensing the application to said digital demodulator of a predetermined consecutive number of digital bits having the same polarity, said further means developing a signal indicating the receipt by said digital demodulator of said predetermined consecutive number of digital bits having the same polarity.

24. A digital demodulator as claimed in claim 23 wherein said further means includes a shift register, and wherein said further means includes gates connected to the outputs of said shift register.

25. A digital demodulator as claimed in claim 23 wherein said further means includes a counter, and wherein the number of stages in said counter is one less than said predetermined consecutive number of digital bits, and wherein said further means simultaneously responds to signals at the outputs of said counter and to a signal at the input of said counter to sense the application to said digital demodulator of said predetermined consecutive number of digital bits having the same polarity.

26. A digital demodulator as claimed in claim 23 wherein said further means can sense the application to said digital demodulator of a predetermined number of consecutive digital bits of a predetermined polarity and also can sense the application to said digital demodulator of a second predetermined number of consecutive digital bits having the opposite polarity.

27. A digital demodulator which includes a source of pulses, means to sense the polarity of digital bits applied to said digital demodulator, and an up-down counter, said up-down counter responding to pulses from said source of pulses during a predetermined portion of the time base of said digital modulator to develop a residual count which indicates whether said time base of said digital demodulator is in synchronism with the time base of a digital bit sensed by said means, said up-down counter also developing a signal which helps indicate whether said time base of said digital demodulator leads or lags said time base of said digital bit.

28. A digital demodulator as claimed in claim 27 wherein a control logic circuit is connected to said means and also to said up-down counter, said control logic circuit responding to signals from said means and from said up-down counter to develop signals which indicate the magnitude and polarity of the residual count within the up-down counter, and thereby indicate the magnitude and direction of the displacement of said time base of said digital demodulator relative to said time base of said digital bit.

* * * * *